US012656917B2

(12) United States Patent
Kang et al.

(10) Patent No.: US 12,656,917 B2
(45) Date of Patent: Jun. 16, 2026

(54) TOUCH SENSOR INCLUDING AN INSULATING LAYER AND DISPLAY DEVICE INCLUDING THE SAME

(71) Applicant: SAMSUNG DISPLAY CO., LTD., Yongin-si (KR)

(72) Inventors: Bong Il Kang, Yongin-si (KR); Min Hong Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 27 days.

(21) Appl. No.: 18/632,195

(22) Filed: Apr. 10, 2024

(65) Prior Publication Data

US 2025/0060853 A1     Feb. 20, 2025

(30) Foreign Application Priority Data

Aug. 14, 2023     (KR) ........................ 10-2023-0106205

(51) Int. Cl.
 *G06F 3/044*      (2006.01)
 *G06F 3/041*      (2006.01)
(52) U.S. Cl.
 CPC ........ *G06F 3/0446* (2019.05); *G06F 3/04164* (2019.05); *G06F 3/0443* (2019.05)

(58) Field of Classification Search
None
See application file for complete search history.

(56) References Cited

U.S. PATENT DOCUMENTS

2018/0307346 A1* 10/2018 Lee ........................ G06F 3/0446
2021/0294460 A1*  9/2021 Yang ..................... G06F 3/0445

FOREIGN PATENT DOCUMENTS

KR    10-2012-0064483 A    6/2012
KR    10-2018-0049378 A    5/2018
KR    10-2022-0110720 A    8/2022

* cited by examiner

*Primary Examiner* — Duane N Taylor, Jr.
(74) *Attorney, Agent, or Firm* — F. CHAU & ASSOCIATES, LLC

(57)     ABSTRACT

A display device according to an embodiment includes a display layer including pixels located in a display area, a sensor layer including a sensing area overlapping with the display area and unit areas corresponding to touch nodes located in the sensing area, sensor electrodes disposed in the unit areas of the sensor layer, sensor lines electrically connected to the sensor electrodes, and an insulating layer provided exclusively in a subset of the unit areas and disposed on portions of the sensor electrodes.

19 Claims, 14 Drawing Sheets

100 : MA, SBA

TL : TL1, TL2
UA : UA1, UA2

TSE : TSE1, TSE2

DR1
DR2
DR3

PX : PX1, PX2, PX3
EA : EA1, EA2, EA3
TSE' : TSE1', TSE2'

TCDL1 : CP1, EP2
TCDL2 : CP2

DR3

TCDL1 : CP1, EP2
TCDL2 : CP2

TOUCH SENSOR INCLUDING AN INSULATING LAYER AND DISPLAY DEVICE INCLUDING THE SAME

This application claims priority under 35 U.S.C. § 119 to Korean Patent Application No. 10-2023-0106205 filed on Aug. 14, 2023, in the Korean Intellectual Property Office, the disclosure of which is herein incorporated by reference in its entirety.

TECHNICAL FIELD

The present disclosure relate to a display device and, more specifically, to a touch sensor including an insulating layer and a display device including the same.

DISCUSSION OF THE RELATED ART

A touch sensor is a device that detects a touch input by a user, and is widely used in various types of electronic devices, including touch-screen display devices. For example, a display device may include a touch sensor that is fabricated integrally with a display panel or disposed on a portion of the display panel, to provide a more convenient input interface.

SUMMARY

A display device includes a display layer including pixels located in a display area. A sensor layer includes a sensing area overlapping the display area and further includes unit areas corresponding to touch nodes located in the sensing area. Sensor electrodes are disposed in the unit areas of the sensor layer. Sensor lines are electrically connected to the sensor electrodes. An insulating layer is exclusively disposed in a subset of the unit areas and disposed on portions of the sensor electrodes.

The sensor electrodes may include first sensor electrodes arranged in a first direction in the sensing area and each extended in a second direction, crossing the first direction. The sensor lines may include first sensor lines electrically connected to the first sensor electrodes at one end of each of the first sensor electrodes in the second direction.

The insulating layer may be provided in unit areas where opposite ends of the first sensor electrodes in the second direction are located, and the insulating layer may be disposed on the sensor electrodes located in the unit areas.

The insulating layer may be provided on each of the first sensor electrodes in a single unit area among the unit areas where each of the first sensor electrodes is located. The single unit area is located at an edge farthest from a corresponding first sensor line electrically connected to each of the first sensor electrodes.

The sensor electrodes may further include second sensor electrodes arranged in the second direction in the sensing area and each extended in the first direction. The sensor lines may further include second sensor lines electrically connected to the second sensor electrodes.

The second sensor lines may be electrically connected to the second sensor electrodes at one ends of the second sensor electrodes in the first direction. The sensing area may include a first sensing area adjacent to points where the second sensor electrodes are electrically connected to the second sensor lines, and a second sensing area disposed farther from the points where the second sensor electrodes are electrically connected to the second sensor lines than the first sensing area is.

The insulating layer may have a first area corresponding to at least one unit area on each of the first sensor electrodes located in the first sensing area and may have a second area corresponding to at least two unit areas on each of the first sensor electrodes located in the second sensing area. The second area may be larger than the first area.

The unit areas may include first unit areas, each having a first area, and at least one second unit area having a second area that is smaller than the first area.

The insulating layer may be disposed in at least the second unit area.

The sensing area may include at least one corner area including the second unit area, and the insulating layer may cover the sensor electrodes in the corner area.

The subset of unit areas with the insulating layer may include first unit areas each having a first area, and at least one second unit area having a second area that is smaller than the first area.

The insulating layer may have a first thickness in the first unit areas and a second thickness that is greater than the first thickness in the second unit area.

A touch sensor includes unit areas corresponding to touch nodes in a sensing area. The touch sensor includes sensor electrodes disposed in the unit areas. Sensor lines are electrically connected to the sensor electrodes. An insulating layer is provided exclusively in a subset of the unit areas and is disposed on portions of the sensor electrodes.

The sensor electrodes may include first sensor electrodes arranged in a first direction and each extended in a second direction, crossing the first direction, in the sensing area. The sensor lines may include first sensor lines electrically connected to the first sensor electrodes at one end of each of the first sensor electrodes in the second direction.

The insulating layer may be provided in unit areas where opposite ends of the first sensor electrodes in the second direction are located and may be disposed on the sensor electrodes located in the unit areas.

The sensor electrodes may further include second sensor electrodes arranged in the second direction and each extended in the first direction in the sensing area. The sensor lines may further include second sensor lines electrically connected to the second sensor electrodes at one ends of the first sensor electrodes in the first direction.

The sensing area may include a first sensing area adjacent to points where the second sensor electrodes are electrically connected to the second sensor lines. A second sensing area may be disposed farther from the points where the second sensor electrodes are electrically connected to the second sensor lines than the first sensing area is. The insulating layer may have a first area corresponding to at least one unit area on each of the first sensor electrodes located in the first sensing area and may have a second area corresponding to at least two unit areas on each of the first sensor electrodes located in the second sensing area.

The unit areas may include first unit areas each having a first area, and at least one second unit area having a second area that is smaller than the first area.

The insulating layer may be disposed in at least the second unit area.

The some of the unit areas with the insulating layer may include first unit areas each having a first area, and at least one second unit having a second area that is smaller than the first area, and the insulating layer may have a first thickness in the first unit areas and a second thickness that is greater than the first thickness in the second unit area.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which embodiments of the invention are shown. This invention may, however, be embodied in different forms and should not necessarily be construed as limited to the embodiments set forth herein. Rather, these embodiments are provided so that this disclosure will be thorough and complete, and will fully convey the scope of the invention to those skilled in the art.

It will also be understood that when an element or a layer is referred to as being "on" another element or layer, it can be directly on the other element or layer, or intervening layers may also be present. The same reference numbers may indicate the same components throughout the specification and the drawings.

It will be understood that, although the terms "first," "second," etc. may be used herein to describe various elements, these elements should not necessarily be limited by these terms. These terms are used to distinguish one element from another element. For instance, a first element discussed below could be termed a second element without departing from the teachings of the present invention. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, embodiments of the present disclosure will be described in detail with reference to the accompanying drawings.

Figure 1:
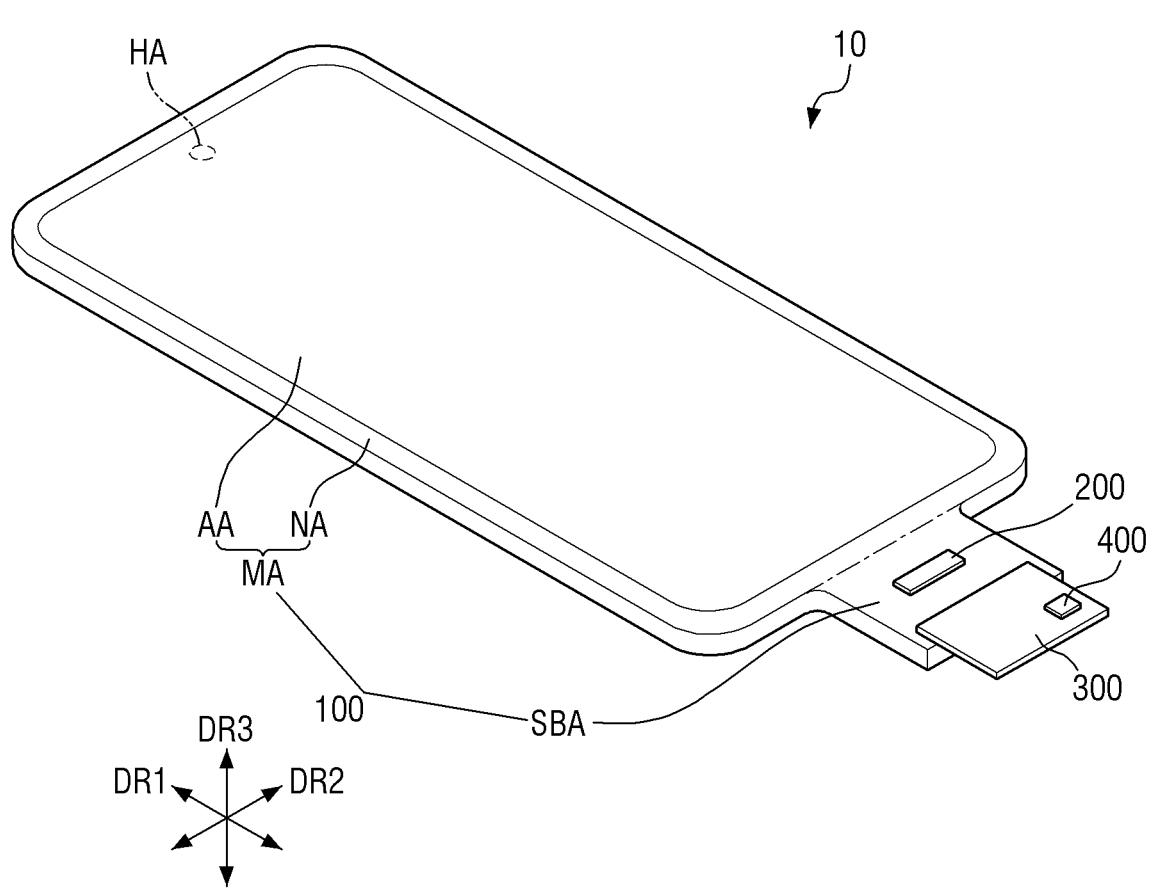
FIG. 1 is a perspective view of a display device according to an embodiment of the present disclosure.

FIG. 1 is a perspective view illustrating a display device 10 according to an embodiment of the present disclosure.

Referring to FIG. 1, a display device 10 is configured to display moving images or still images. The display device 1 may be used as the display screen of portable electronic devices such as a mobile phone, a smart phone, a tablet PC, a smart watch, a watch phone, a mobile communications terminal, an electronic notebook, an electronic book, a portable multimedia player (PMP), a navigation device and an ultra mobile PC (UMPC), as well as the display screen of various products such as a television, a notebook computer, a computer monitor, a digital billboard and an Internet of Things device.

In an embodiment, the display device 10 may be a light-emitting display device such as an organic light-emitting diode (OLED) display device including organic light-emitting diodes, a quantum-dot light-emitting display device including quantum-dot light-emitting layer, and an ultra-small light-emitting display device using ultra-small light-emitting diodes such as micro or nano light-emitting diodes (micro LEDs or nano LEDs). It should be understood, however, that the present disclosure is not necessarily limited thereto. For example, the display device 10 may be other types of display devices than light-emitting display devices.

In an embodiment, the display device 10 may be flat. For example, the display device 10 may be substantially flat on the plane defined by the first direction DR1 and the second direction DR2, and may have a predetermined thickness (or height) in the third direction DR3. According to an embodiment of the present disclosure, the display device 10 may include at least some curved portions. Furthermore, the display device 10 may have a variety of shapes. According to an embodiment of the present disclosure, the display device 10 may be flexible so that it can be curved, bent, folded or rolled.

In an embodiment, the first direction DR1 may correspond to a longitudinal direction, a column direction, or a vertical direction of an active area AA. The second direction DR2 may intersect the first direction DR1 and, for example, may correspond to a traverse direction, a row direction, or a horizontal direction of the active area AA. For example, the first direction DR1 may coincide with or be parallel to the longitudinal direction, the column direction or the vertical direction of the active area AA, while the second direction DR2 may coincide with or be parallel to the traverse direction, the row direction or the horizontal direction of the active area AA. The third direction DR3 may cross the first direction DR1 and the second direction DR2, and may be orthogonal to the plane defined by the first direction DR1 and the second direction DR2. For example, the third direction DR3 may be a thickness direction or a height direction of the display device 10.

The display device 10 may include a display panel 100, a display driver circuit 200 and a circuit board 300. In addition, the display device 10 may include a touch sensor. For example, the display device 10 may further include a touch sensor that includes sensor electrodes disposed in the active area AA, etc., and a touch driver circuit 400 electrically connected to the sensor electrodes. According to an embodiment of the present disclosure, the sensor electrodes may be disposed on the display panel 100, and the touch driver circuit 400 may be mounted on the circuit board 300.

The display panel 100 may include a main area MA including an active area AA, and a subsidiary area SBA located on one side of the main area MA.

The main area MA may include the active area AA and a non-active area NA at least partially surrounding the active area AA. The active area AA may be located in the center of the main area MA and may occupy most of the main area MA. The non-active area NA may be located at the edges of the main area MA and may be in contact with the subsidiary area SBA.

The active area AA may include a display area and a sensing area. In the display area, pixels may be provided and/or arranged, and images may be displayed by the pixels. In the sensing area, the sensor electrodes (also referred to as sensing patterns), e.g., sensor electrodes of the touch sensor are provided and/or arranged, and a touch input, etc. may be sensed by the sensor electrodes (e.g., a touch sensing area). The display area and the sensing area may be substantially the same area or may be different areas. In addition, the display area and the sensing area may overlap or might not overlap each other. In the following embodiments, the display area and the sensing area are substantially the same or overlap each other. For example, the sensing area may be the entirety or a part of the display area.

In an embodiment, the active area AA may include a pair of longer sides extending in the first direction DR1 and a pair of shorter sides extending in the second direction DR2 and may be formed as a flat surface having a generally rectangular shape. According to an embodiment of the present disclosure, corners where the longer sides and the shorter sides of the active area AA meet each other may be rounded, or may have a gradually varying width with a boundary line such as an inclined line and a stair-like shape. The shape of the active area AA may vary depending on the embodiments. For example, the active area AA may be formed in a polygonal shape other than a square shape, a circular shape, an elliptical shape, or an irregular shape.

In an embodiment, the display device 10 may include a hole area HA formed inside or at least partially surrounded by the active area AA. According to an embodiment, in the hole area HA, a camera or a proximity sensor is placed (e.g., a light-transmissive area). The sensor electrodes of the touch sensor might not be provided in the hole area HA. For example, the sensor electrodes located at touch nodes around the hole area HA may have an area reduced by the amount equal to the size of the hole area HA.

The non-active area NA may be located immediately around the active area AA. For example, the non-active area NA may be in contact with the edges of the active area AA and may at least partially surround the active area AA. The non-active area NA may include a dam area and an inorganic encapsulation area. According to an embodiment, an embedded circuit may be disposed in the non-active area NA. For example, embedded circuitry including a scan driver circuit and the like may be disposed in the non-active area NA located on one side (e.g., the left or right side) or both sides of the active area AA.

The subsidiary area SBA may be located on one side of the main area MA. For example, the subsidiary area SBA may protrude from one side of the main area MA in the first direction DR1. For example, the subsidiary area SBA may protrude from the lower end of the main area MA in the first direction DR1. According to an embodiment, the subsidiary area SBA may have a smaller width than the main area MA. For example, the subsidiary area SBA may have a smaller width than the main area MA, as measured in the second direction DR2.

Lines and pads may be disposed in the subsidiary area SBA. For example, in the subsidiary area SBA, the lines and the pads electrically connected to the pixels, the sensor electrodes and/or the embedded circuitry located in the main area MA, and the display driver circuit 200 and/or the circuit board 300 located in the subsidiary area SBA. At least some of the lines may be electrically connected to the pixels and the sensor electrodes located in the active area AA inside or around the active area AA. In the following description of the embodiments, the term "electrically connected" may further include a physical connection in addition to an electrical connection.

In an embodiment, the display driver circuit 200 may be disposed in the subsidiary area SBA. The circuit board 300 may be disposed on a portion of the subsidiary area SBA.

The display driver circuit 200 may include a data driver circuit for driving pixels. According to an embodiment, the display driver circuit 200 may be an integrated circuit (IC) chip and mounted in the subsidiary area SBA. According to an embodiment, the display driver circuit 200 may be disposed on the circuit board 300 in the subsidiary area SBA, or may be disposed on another circuit board electrically connected to the display panel 100 through the circuit board 300.

The circuit board 300 may be disposed on a portion of the subsidiary area SBA. For example, the circuit board 300 may be bonded on the pads located at a location (e.g., the lower edge) of the subsidiary area SBA, and may supply or transmit supply voltages and driving signals for driving the display panel 100 to the display panel 100. For example, the circuit board 300 may supply the display panel 100 with input image data (e.g., digital image data), driving signals including timing signals, and driving voltages. According to an embodiment, the circuit board 300 may supply the display panel 100 with driving signals for driving at least some of the sensor electrodes (e.g., driving electrodes), and may receive sensing signals output from the at least one some of the sensing electrodes (e.g., sensing electrodes). The circuit board 300 may be, but is not necessarily limited to being, a flexible printed circuit board (FPCB), a printed circuit board (PCB) or a flexible film such as chip on film (COF).

The touch driver circuit 400 may be electrically connected to sensor electrodes disposed on the display panel 100 (or disposed on a sensor layer coupled to the display panel 100). For example, the touch driver circuit 400 may be electrically connected to sensor electrodes through sensor lines electrically connected to the sensor electrodes. According to an embodiment, the touch driver circuit 400 may be implemented as an integrated circuit (IC) chip and may be mounted on the circuit board 300. Alternatively, the touch driver circuit 400 may be mounted on the subsidiary area SBA like the display driver circuit 200. The shape and location of the touch driver circuit 400 may vary depending on the embodiments.

The touch driver circuit 400 may apply touch driving signals to at least some sensor electrodes provided in the display panel 100, etc., and may receive touch sensing signals through the at least some sensor electrodes. For example, when the touch sensor is a mutual capacitance touch sensor including driving electrodes and sensing electrodes, the touch driver circuit 400 may apply touch driving signals to the driving electrodes during a sensing period in which the touch sensor is activated, may receive a touch sensing signal from each of the touch nodes through the sensing electrodes, and may sense the amount of changes in mutual capacitance based on the touch sensing signal. The touch driver circuit 400 (or a host processor that receives an electrical signal corresponding to a touch sensing signal from the touch driver circuit 400) may determine whether there is the user's touch or proximity and identify the location, if any, etc. based on the touch sensing signal from each of the touch nodes.

Figure 2:
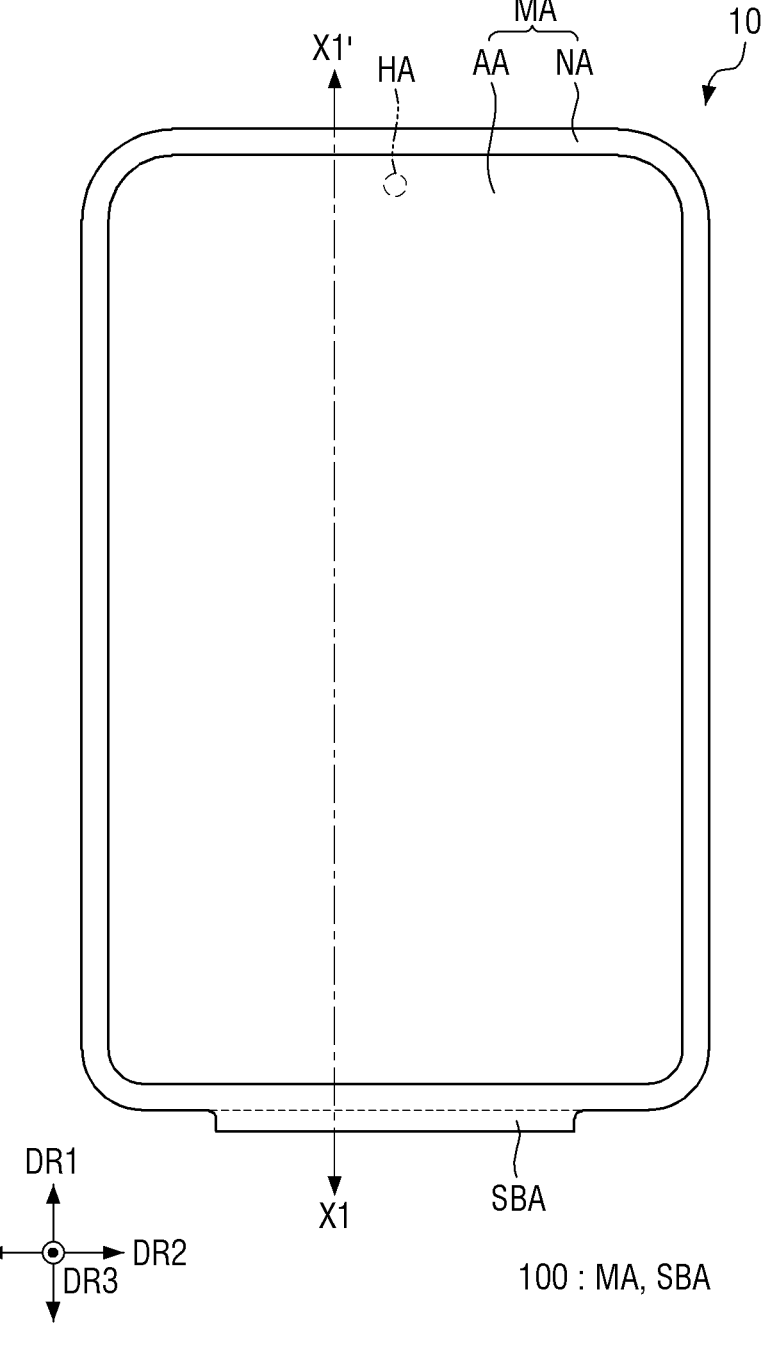
FIG. 2 is a plan view illustrating the display device of FIG. 1.
Figure 3:
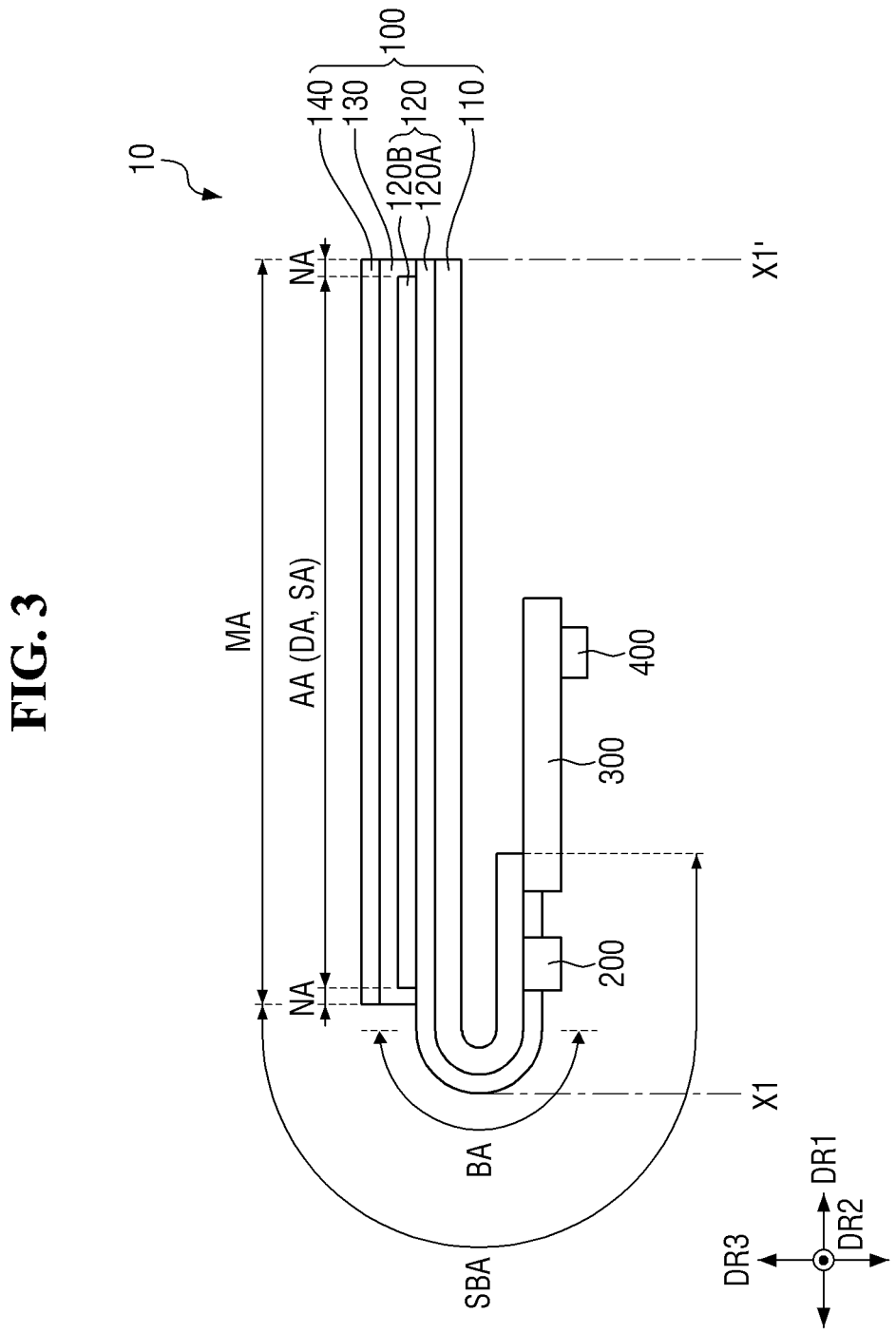
FIG. 3 is a cross-sectional view illustrating an example, taken along line X1-X1' of FIG. 2.

FIG. 2 is a plan view illustrating the display device 10 of FIG. 1. FIG. 3 is a cross-sectional view illustrating an example, taken along line X1-X1' of FIG. 2.

FIG. 1 shows the display device 10 when it is in an un-bent state, while FIGS. 2 and 3 show the display device 10 when it is in a bent state, e.g., when it is bent in the subsidiary area SBA. For example, FIG. 1 shows the subsidiary area SBA extended in parallel with the main area MA, while FIGS. 2 and 3 show a portion of the subsidiary area SBA bent and located on the rear side of the main area MA.

Referring to FIGS. 2 and 3 in conjunction with FIG. 1, the display panel 100 may include a substrate 110 including the main area MA and the subsidiary area SBA, and a display layer 120 and an encapsulation layer 130 sequentially disposed on the substrate 110. According to an embodiment of the present disclosure, the display panel 100 may be a light-emitting display (LED) panel including light-emitting elements, and the display layer 120 may include a circuit layer 120A and a light-emitting element layer 120B sequentially disposed on the substrate 110.

In an embodiment, the display panel 100 may further include a sensor layer 140 (e.g., a touch sensor layer) disposed on the encapsulation layer 130. However, the position of the sensor layer 140 is not necessarily limited thereto. For example, the sensor layer 140 may be prepared separately from the display panel 100 and disposed on the display panel 100. For example, the display device 10 may include the sensor layer 140 that is fabricated integrally with the display panel 100 or separately from the display panel 100. When the sensor layer 140 is fabricated separately from the display panel 100, the sensor layer 140 may include a separate base (e.g., a substrate or film).

In an embodiment, the display device 10 may further include additional elements disposed on the sensor layer 140. For example, the display device 10 may further include at least one of: an optical layer (e.g., a polarizing layer or a color filter layer) and a protective layer (e.g., a window or a protective film) disposed on the sensor layer 140. According to an embodiment of the present disclosure, an optical layer and/or a protective layer may be disposed in the display panel 100. For example, the optical layer and/or the protective layer may be fabricated integrally with the display panel 100. According to an embodiment, the optical layer and/or the protective layer may be fabricated separately from the display panel 100 and attached to the display panel 100 by an adhesive layer or the like.

The substrate 110 may include an insulating material such as a polymer resin. For example, the substrate 110 may be made of polyimide or other electrically insulating materials. The substrate 110 may be a flexible substrate that can be deformed, i.e., bent, folded, or rolled to a noticeable extent without cracking or otherwise sustaining damage. Alternatively, the substrate 110 may be made of an electrically insulating material such as glass. The substrate 110 may include the main area MA including the active area AA and the non-active area NA, and a subsidiary area SBA extended from one side of the main area MA.

The circuit layer 120A may be located in the main area MA and the subsidiary area SBA on the substrate 110. The circuit layer 120A may include circuit elements provided to the pixels of the display area DA (e.g., transistors and capacitors forming the pixel circuits of the pixels), lines electrically connected to pixels, etc.

The light-emitting element layer 120B may be located on the substrate 110 and the circuit layer 120A. For example, the light-emitting element layer 120B may be located in the main area MA. The light-emitting element layer 120B may include light-emitting elements provided to the pixels of the display area DA (e.g., light-emitting elements electrically connected to the pixel circuits and disposed in the emission areas, respectively), etc. For example, each of the pixels may include at least one light-emitting element and a pixel circuit electrically connected to the light-emitting element. The pixels may be located in pixel areas, respectively, located in the display area DA. Each of the pixel areas may include an emission area where a light-emitting element is disposed, and a pixel circuit area where a pixel circuit is disposed. According to an embodiment, the emission area and the pixel circuit area of each pixel may overlap each other, but the present disclosure is not necessarily limited thereto. Although the circuit layer 120A and the light-emitting element layer 120B are separated from each other in the example shown in FIG. 3, the embodiments are not necessarily limited thereto. For example, the circuit layer 120A and the light-emitting element layer 120B may be implemented as a single element.

The encapsulation layer 130 may be located on the substrate 110 and the circuit layer 120A. For example, the encapsulation layer 130 may be located in the main area MA and may cover the light-emitting element layer 120B. The encapsulation layer 130 may encapsulate the pixels located in the display area DA. The encapsulation layer 130 may be extended to the non-active area NA and may be in contact with the circuit layer 120A. According to an embodiment of the present disclosure, the encapsulation layer 130 may be, but is not necessarily limited to, a multi-layer encapsulation layer including at least two inorganic encapsulation films overlapping each other and at least one organic encapsulation film interposed between the inorganic encapsulation films.

The sensor layer 140 may be disposed on the encapsulation layer 130 and may be disposed at least in the main area MA. According to an embodiment, the sensor layer 140 may be a touch sensor layer and may include sensor electrodes for sensing touch input (physical contact or proximity, etc.) by a person or an object, and sensor lines electrically connected to the sensor electrodes. For example, the touch sensor may include the sensor layer 140 including the sensor electrodes and the sensor lines, and may optionally further include a touch driver circuit 400. The touch driver circuit 400 may be provided in the touch sensor, or on a circuit board or a host device electrically connected to the touch sensor.

The sensor layer 140 may be disposed at least in the main area MA and may include the active area AA and the non-active area NA. The sensor layer 140 may include the sensor electrodes disposed in the sensing area SA of the active area AA, and the sensor lines electrically connected to the sensor electrodes and passing through the non-active area NA. FIG. 3 shows the schematic location of the sensor layer 140 with respect to the sensor electrodes.

In an embodiment, the sensor area SA may overlap with the display area DA. For example, the sensing area SA may be at least similar to or be substantially identical to the display area DA, and the entire active area AA may be the display area DA and also the sensing area SA.

The sensor lines may be extended from the main area MA to the subsidiary area SBA. According to an embodiment, the sensor lines may be electrically connected to the circuit board 300 through the respective pads in the subsidiary area SBA, and may be electrically connected to the touch driver circuit 400 through the circuit board 300. The sensor layer 140 may sense a touch input, etc. made in the sensing area SA using the sensor electrodes.

In an embodiment, the display panel 100 may be bent in the bending area BA. The bending area BA may be a part or a section of the subsidiary area SBA and may be spaced apart from the main area MA.

The substrate 110 and the circuit layer 120A may be bent in the bending area BA corresponding to a portion of the subsidiary area SBA. Accordingly, the bezel area recognized by the user as the non-active area NA can be reduced or minimized.

Figure 4:
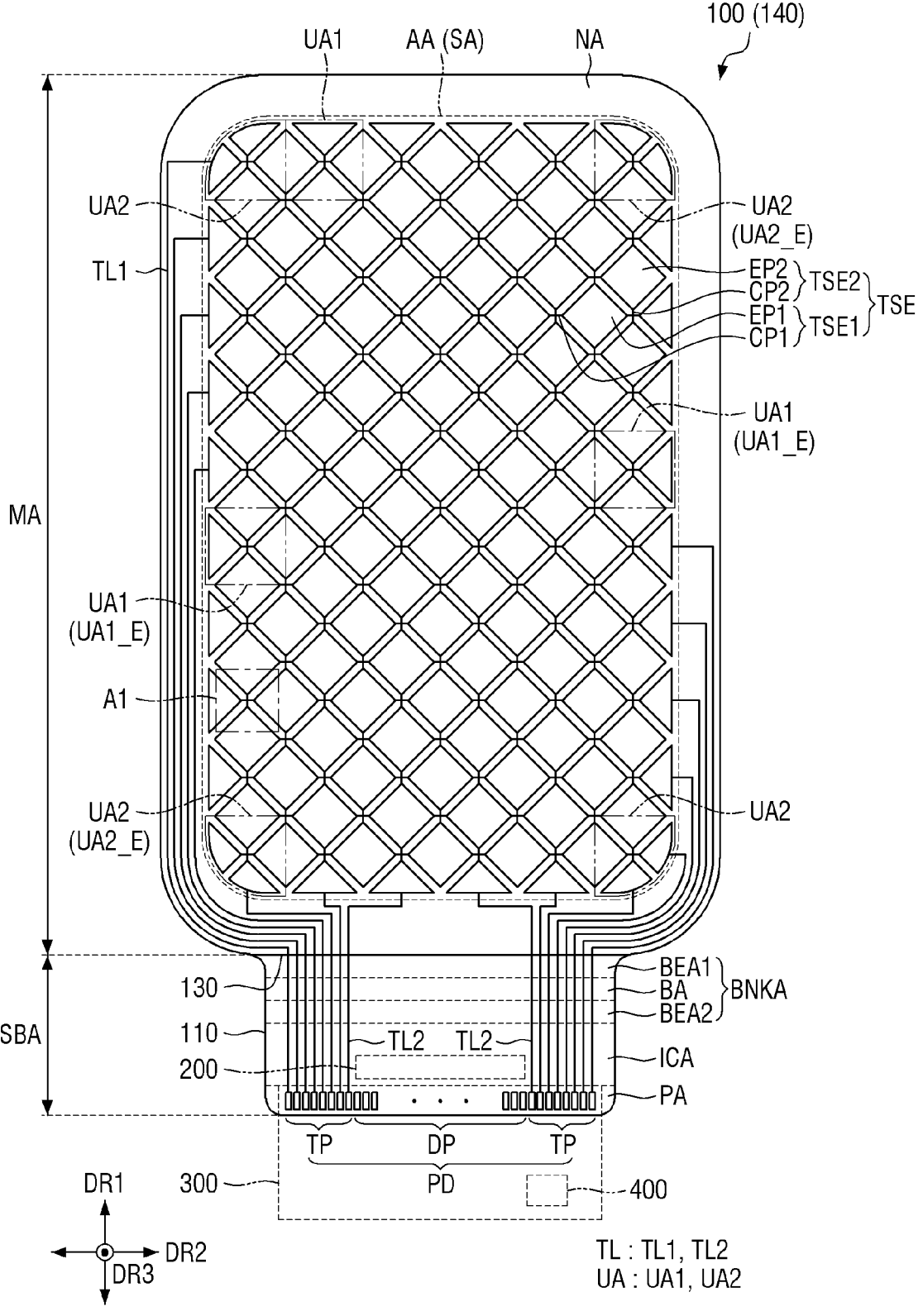
FIG. 4 is a plan view illustrating a display panel according to an embodiment of the present disclosure.
Figure 5:
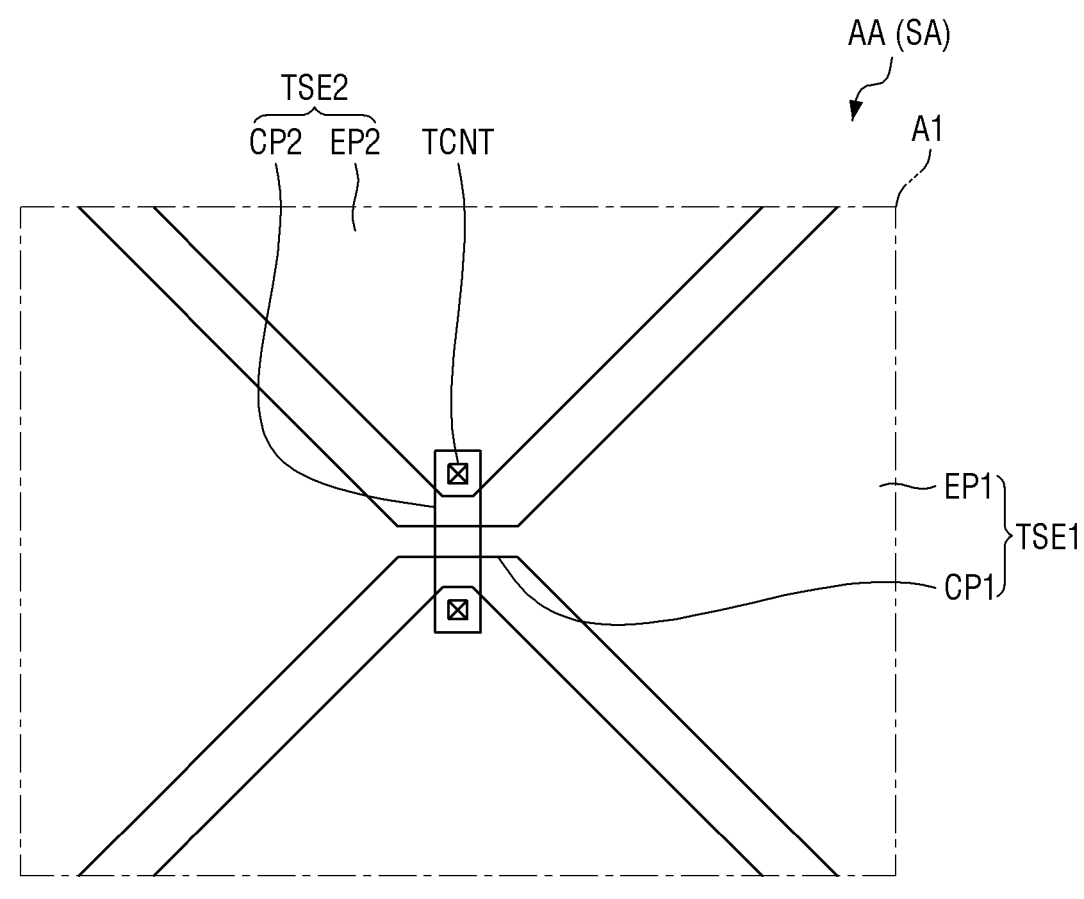
FIG. 5 is a plan view illustrating an active area according to an embodiment of the present disclosure.
Figure 5:
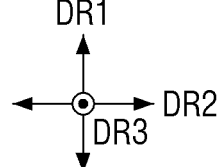

FIG. 4 is a plan view illustrating the display panel 100, according to an embodiment of the present disclosure. For example, FIG. 4 is a plan view illustrating the display panel 100 including the sensor layer 140 according to an embodiment when the display panel is not bent. FIG. 5 is a plan view illustrating the active area AA, according to an embodiment. For example, FIG. 5 shows a portion of the sensing area SA corresponding to area A1 in FIG. 4.

Referring to FIGS. 4 and 5 in conjunction with FIGS. 1 to 3, the display panel 100 may include the main area MA including the active area AA and the non-active area NA, and the subsidiary area SBA including a bank area BNKA, a driver circuit area ICA and a pad area PA.

The sensor layer 140 may include the sensor electrodes TSE disposed in the active area AA (e.g., the sensing area SA), and the sensor lines TL electrically connected to the sensor electrodes TSE (also referred to as touch trace lines). For example, the sensor layer 140 may include the active area AA including the sensing area SA and the non-active area NA. The sensor electrodes TSE may be disposed in the sensing area SA of the sensor layer 140. The sensor lines TL may be disposed in the non-active area NA of the sensor layer 140.

In an embodiment, the sensor lines TL may be extended from the main area MA to the subsidiary area SBA. For example, some of the sensor lines TL may be located in the main area MA and electrically connected to the respective sensor electrodes TSE, while some others of the sensor lines TL may be located in the subsidiary area SBA and may be electrically connected to the respective second pads TP.

In an embodiment, the sensor layer 140 may be formed integrally with the display panel 100. For example, portions of the sensor lines TL and the sensor electrodes TSE located in the main area MA may be formed on the encapsulation layer 130, while the other portions of the sensor lines TL located in the subsidiary area SBA may be formed on the substrate 110 (or inside and/or on the circuit layer 120A on the substrate 110).

The sensor layer 140 may include unit areas UA corresponding to the respective touch nodes located in the sensing area SA. For example, the sensor layer 140 may include the unit areas UA that include intersections where the sensor electrodes TSE intersect each other and correspond to the touch nodes where mutual capacitance is formed by a pair of sensor electrodes TSE. When the sensor electrodes TSE are generally uniformly disposed in the sensing area SA, the unit areas UA may be generally uniformly distributed in the sensing area SA. In FIG. 4, only some of the unit areas UA including at least one first unit area UA1 and second unit area UA2 are denoted by symbols. The first unit area UA1 may indicate a unit area UA having a first area, and the second unit area UA2 may indicate a unit area UA having a second area smaller than the first area. For example, the sensor layer 140 may include a plurality of first unit areas UA1 each having a first area, and at least one second unit area UA2 having a second area.

In an embodiment, the unit areas UA may have a generally uniform size (e.g., the uniform area). For example, the majority of the unit areas UA located in the sensing area SA may be first unit areas UA1, and a few of them may be second unit areas UA2. For example, only a few second unit areas UA2 located at the corners of the sensing area SA have a smaller area than the other unit areas UA (i.e., the first unit areas UA1).

The sensor electrodes TSE may include first sensor electrodes TSE1 and second sensor electrodes TSE2 arranged and/or extended in different directions. According to an embodiment, the first sensor electrodes TSE1 may be arranged in the first direction DR1 in the sensing area SA and each may be extended extend in the second direction DR2. The second sensor electrodes TSE2 are arranged in the second direction DR2 in the sensing area SA, and each may be extended in the first direction DR1 to intersect the first sensor electrodes TSE1.

In an embodiment, the sensor electrodes TSE form a mutual capacitance touch sensor and may include driving electrodes and sensing electrodes. For example, the first sensor electrodes TSE1 may be sensing electrodes (e.g., Rx electrodes for sensing the voltage charged in the mutual capacitance with the driving electrodes during a sensing period when the touch sensor is activated). The second sensor electrodes TSE2 may be driving electrodes (e.g., Tx electrodes to which a touch driving signal is applied from the touch driver circuit 400 during the sensing period when the touch sensor is activated).

The unit areas UA may be formed at the intersections of the first and second sensor electrodes TSE1 and TSE2. For example, a plurality of unit areas UA located in the columns corresponding to the second sensor electrodes TSE2 may be formed in each row where the first sensor electrodes TSE1 are located.

The sensor electrodes TSE may be disposed in each of the unit areas UA of the sensor layer 140. For example, in each of the unit areas UA, a pair of a first sensor electrode TSE1 and a second sensor electrode TSE2 (or a pair of a portion of a first sensor electrode TSE1 and a portion of a second sensor electrode TSE2) may be located.

Each first sensor electrode TSE1 may include first electrode portions EP1 (also referred to as first electrode cells) and first connection portions CP1. At each first sensor electrode TSE1, the first electrode portions EP1 may be arranged in the second direction DR2, and the first connection portions CP1 may connect between the first electrode portions EP1.

In an embodiment, each of the first electrode portions EP1 may be a plate-like pattern having a generally diamond shape or another shape (e.g., a square shape, a hexagon shape, a circle shape, etc.). According to an embodiment, each of the first electrode portions EP1 may have a mesh pattern.

In an embodiment, the first connection portions CP1 may be formed integrally with the first electrode portions EP1 as shown in FIG. 5. According to an embodiment, the first connection portions CP1 may be formed as bridge-like conductive patterns that are not integrated with the first electrode portions EP1. For each of the first sensor electrodes TSE1, at least one first connection portion CP1 may be formed between two adjacent first electrode portions EP1.

Each second sensor electrode TSE2 may include second electrode portions EP2 (also referred to as second electrode cells) and second connection portions CP2. At each second sensor electrode TSE2, the second electrode portions EP2 may be arranged in the first direction DR1, and the second connection portions CP2 may connect between the second electrode portions EP2.

In an embodiment, each of the second electrode portions EP2 may be a plate-like pattern having a generally diamond shape or another shape (e.g., a square shape, a hexagon shape, a circle shape, etc.). According to an embodiment, each of the second electrode portions EP2 may have a mesh pattern.

In an embodiment, the second connection portions CP2 may be formed as bridge-like conductive patterns that are not integrated with the second electrode portions EP2 as shown in FIG. 5. The second connection portions CP2 may be electrically connected to the respective second electrode portions EP2 through contact portions TCNT including at least one contact hole. According to an embodiment of the present disclosure, the first electrode portions EP1, the second electrode portions EP2 and the first connection portions CP1 may be disposed or provided in the same layer in the sensor layer 140, and the second connection portions CP2 may be disposed in a different layer from the first electrode portions EP1, the second electrode portions EP2 and the first connection portions CP1 in the sensor layer 140. According to an embodiment, the second connection portions CP2 may be formed integrally with the second electrode portions EP2. For each of the second sensor electrodes TSE2, at least one second connection portion CP2 may be formed between two adjacent second electrode portions EP2.

The sensor electrodes TSE may include at least one electrically conductive material, and the material of the sensor electrodes TSE is not particularly limited to any one type of material. According to an embodiment, each of the first electrode portion EP1, the second electrode portion EP2, the first connection portion CP1 and/or the second connection portion CP2 may have a multilayer structure in which at least two electrically conductive layers are stacked. For example, each of the first electrode portion EP1, the second electrode portion EP2, the first connection portion CP1 and/or the second connection portion CP2 may have a multilayer structure including continuously stacked metal layers, such as titanium (Ti)/aluminum (Al)/titanium (Ti).

In addition to the above-described embodiments, the type, structure and material of the sensor layer 140 may be altered in various ways. For example, the type, configuration, structure, shape, size, position and/or material of the sensor electrodes TSE may vary depending on the embodiments.

The sensing area SA may respond to a touch input by the sensor electrodes TSE. For example, when a touch input is provided to the sensing area SA while the touch sensor is activated, sensing signals in response to the touch input may be output from the sensor electrodes TSE.

The sensor lines TL may be electrically connected to the sensor electrodes TSE. For example, the sensor lines TL may be electrically connected between the respective sensor electrodes TSE and the respective second pads TP. The sensor electrodes TSE and the sensor lines TL may be electrically connected to the touch driver circuit 400 through the respective second pads TP.

In an embodiment, the sensor lines TL may be electrically connected to the respective sensor electrodes TSE inside the active area AA or at the boundary between the active area AA and the non-active area NA. The sensor lines TL may be electrically connected to the respective second pads TP disposed in the pad area PA beyond the non-active area NA.

The sensor lines TL may include first sensor lines TL1 electrically connected to the respective first sensor electrodes TSE1, and second sensor lines TL2 electrically connected to the respective second sensor electrodes TSE2. According to an embodiment, the first sensor lines TL1 may be electrically connected to the respective first sensor electrodes TSE1 at one end (e.g., the left end or the right end) of the first sensor electrodes TSE1 in the second direction DR2. According to an embodiment, the second sensor lines TL2 may be electrically connected to the respective second sensor electrodes TSE2 at one end of the second sensor electrodes TSE2 in the first direction DR1 (e.g., the lower end of each of the second sensor electrodes TSE2).

The mutual capacitance formed in the unit areas UA of the sensor layer 140 may vary depending on the connection structure and/or connection points between the sensor electrodes TSE and the sensor lines TL. For example, the magnitude of mutual capacitance formed in the unit areas UA may vary depending on the positions where the sensor electrodes TSE are electrically connected to the respective sensor lines TL and/or the distance from the connection points between the sensor electrodes TSE and the sensor lines TL, etc. For example, if the other conditions are substantially the same, such as the size (e.g., area) of the unit areas UA and the size of the sensor electrodes TSE formed in the unit areas UA, etc., the magnitude of the mutual capacitance formed in y unit areas UA1_E and UA2_E located at the edge farthest from the points where the first sensor electrodes TSE1 are electrically connected to the first sensor lines TL1 among the unit areas UA formed in the first sensor electrodes TSE1 may be smaller than the magnitude of the mutual capacitance formed in the other unit areas UA of the first sensor electrodes TSE1. Such variations in the mutual capacitance may reduce the touch sensitivity.

In addition, the mutual capacitance formed in the unit areas UA of the sensor layer 140 may vary depending on differences in area between the unit areas UA (or difference in area between the sensor electrodes TSE accordingly), etc. For example, in the second unit areas UA2 that have a small area than the first unit areas UA1, the area of the sensor electrodes TSE may also be smaller, and the magnitude of mutual capacitance between the sensor electrodes TSE may be smaller.

In view of the above, in embodiments to be described later with reference to FIGS. 7 to 14, schemes for compensating for variations in the mutual capacitance according to the line connection structure of the touch sensor and/or differences in area between the unit areas (or the touch nodes).

The subsidiary area SBA may include the bank area BNKA, the driver circuit area ICA and the pad area PA sequentially arranged on one side of the main area MA. In the subsidiary area SBA, a variety of lines (or portions of the lines) including the sensor lines TL, the bank, and the pads PD may be disposed. At least some of the lines may be extended to the main area MA and may be electrically connected to the pixels and/or the sensor electrodes TSE.

In the bank area BNKA, the bank including at least one organic film may be disposed. According to an embodiment of the present disclosure, the bank area BNKA may include the bending area BA. For example, the bank area BNKA may include the bending area BA spaced apart from the main area MA, and a first edge area BEA1 and a second edge area BEA2 located on both sides of the bending area BA in the first direction DR1. The bank may be provided in the bending area BA and its surrounding area (e.g., the first edge area BEA1 and the second edge area BEA2 of the bank area BNKA) to cover the lines passing through the bending area BA. According to an embodiment, inorganic insulating films provided in the display panel 110 may be removed from the bending area BA. The lines passing through the bending area BA may be covered by the bank including at least one organic insulating film. The display panel 100 may be bent in the bending area BA so that a portion of the subsidiary area SBA may be located on the rear side of the main area MA.

In the driver circuit area ICA, the display driver circuit 200 may be mounted. Input/output pads for electrically connecting at least some lines with the display driver circuit 200 may be disposed in the driver circuit area ICA. For example, in the driver circuit area ICA, the input pads for electrically connecting the display driver circuit 200 with certain pads (e.g., data input pads) of the pad area PA, and the output pads for connecting the display driver circuit 200 with the pixels may be disposed.

In some embodiments, the display driver circuit 200 might not be mounted on the display panel 100. In this instance, the display panel 100 might not include the driver circuit area ICA, and only the lines may be disposed between the bank area BNKA and the pad area PA.

In some embodiments, the bank might not be provided in the subsidiary area SBA. In this instance, the subsidiary area SBA might not include the bank area BNKA.

In the pad area PA, the pads PD for transmitting supply voltages and driving signals required for driving the display panel 100 may be provided or disposed. The pads PD may include first pads DP for displaying images (e.g., pads for display), and second pads TP for sensing a touch input (e.g., touch pads). For example, the first pads DP may include power pads and signal pads electrically connected to the pixels and/or embedded circuitry of the display panel 100 and the display driver circuit 200, and the second pads TP may include signal pads electrically connected to the sensor electrodes TSE. The circuit board 300 may be disposed or bonded on the pads PD.

Figure 6:
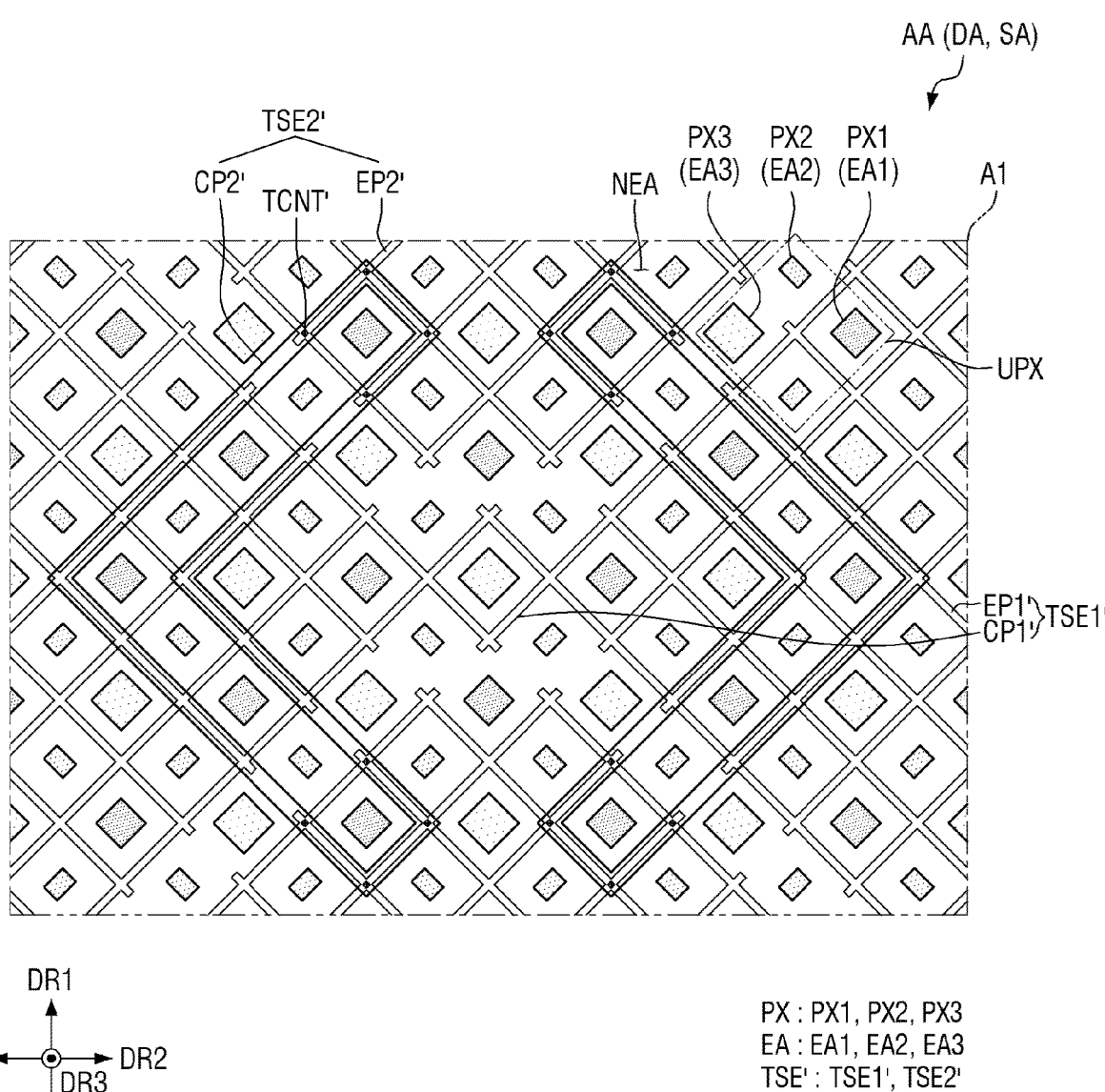
FIG. 6 is a plan view illustrating an active area according to an embodiment of the present disclosure.

FIG. 6 is a plan view illustrating the active area AA according to an embodiment. For example, FIG. 6 shows a portion of the display area DA and the sensing area SA corresponding to area A1 in FIG. 4. FIG. 6 shows sensor electrodes TSE' having different shape and/or structure from the embodiment of FIG. 5. For example, the sensor electrodes TSE' may have a mesh pattern, and two second connection portions CP2' may be disposed between two adjacent second electrode portions EP2'.

Referring to FIG. 6 in conjunction with FIGS. 1 to 5, the pixels PX and the sensor electrodes TSE' may be disposed in the active area AA. The pixels PX and the sensor electrodes TSE' may be disposed in different layers in the display panel 100 and may overlap each other or might not overlap each other. For example, the pixels PX may be disposed in the display layer 120 and may be located in the display area DA included in the active area AA. According to an embodiment, each of the pixels PX may include a pixel circuit including circuit elements disposed in the circuit layer 120A of the display layer 120, and light-emitting elements disposed in the light-emitting element layer 120B of the display layer 120. The sensor electrodes TSE' may be disposed in the sensor layer 140 overlapping with the display layer 120 and may be located in the sensing area SA included in the active area AA.

In an embodiment, the pixels PX may include pixels PX of at least two colors. For example, the pixels PX may include first color pixels PX1 emitting light of a first color (e.g., red light), second color pixels PX2 emitting light of a second color (e.g., green light), and third color pixels PX3 emitting light of a third color (e.g., green light). Each of the first color pixels PX1 may include a first emission area EA1 and may emit light of the first color (e.g., red light) in the first emission area EA1. Each of the second color pixels PX2 may include a second emission area EA2 and may emit light of the second color (e.g., green light) in the second emission area EA2. Each of the third color pixels PX3 may include a third emission area EA3 and may emit light of the third color (e.g., blue light) in the third emission area EA3. FIG. 6 shows the arrangement structure of the pixels PX with respect to the emission areas EA of the pixels PX. The rest of the active area AA except the emission areas EA of the pixels PX may be a non-emission area NEA.

In an embodiment, the first color pixels PX1 and the third color pixels PX3 may be arranged alternately in the first direction DR1 and the second direction DR2. The second color pixels PX2 may be arranged side by side in the first direction DR1 and the second direction DR2, and may be adjacent to the first color pixels PX1 or the third color pixels PX3 in diagonal directions crossing the first direction DR1 and the second direction DR2.

Each of the emission areas EA of the first color pixels PX1, the second color pixels PX2 and/or the third color pixels PX3 may have a quadrilateral shape, such as a diamond or a rectangle. Alternatively, each of the emission areas EA of the first color pixels PX1, the second color pixels PX2 and/or the third color pixels PX3 may have other shapes than the quadrilateral shape.

In an embodiment, the first color pixels PX1, the second color pixels PX2 and/or the third color pixels PX3 may include the emission areas EA of different sizes. For example, the first color pixels PX1, the second color pixels PX2 and the third color pixels PX3 may be formed to include the emission areas EA of different sizes and/or ratios depending on the light efficiency, lifespan of the pixels PX and/or white balance, etc.

At least one first color pixel PX1, at least one second color pixel PX2 and at least one third color pixel PX3 adjacent to each other may form a unit pixel UPX. For example, one first color pixel PX1, two second color pixels PX2 and one third color pixel PX3 adjacent to each other may form a single unit pixel UPX. Each unit pixel UPX may emit light of various colors, including white light, by mixing colors of lights emitted from the emission areas EA of the pixels PX forming the unit pixel UPX.

The sensor electrodes TSE' may be touch electrodes for detecting a user's touch or proximity. According to an embodiment, the sensor electrodes TSE' may be disposed only in the sensing area SA that overlaps with the display area DA, but the present disclosure is not necessarily limited thereto. For example, the sensor electrodes TSE' may also be provided in areas that do not overlap with the display area DA. The area where the sensor electrodes TSE' are disposed may be the sensing area SA and ma generate sensing signals according to a touch input, etc.

In an embodiment, the sensor electrodes TSE' may be formed in a mesh pattern. For example, the first electrode portions EP1' and first connection portions CP1' of each of the first sensor electrodes TSE1', the second electrode portions EP2' and/or the second connection portions CP2' of each of the second sensor electrodes TSE2' may be a mesh pattern including at least one opening. According to an embodiment of the present disclosure, the first electrode portions EP1', the second electrode portions EP2', the first connection portions CP1' and the second connection portions CP2' may include openings corresponding to the emission areas EA of the pixels PX. Accordingly, light loss of the display device 10 can be prevented or reduced, and light efficiency can be increased.

In an embodiment, the first electrode portions EP1', the second electrode portions EP2' and the first connection portions CP1' may be disposed or provided in the same layer in the sensor layer 140, and the second connection portions CP2' may be disposed in a different layer from the first electrode portions EP1', the second electrode portions EP2' and the first connection portions CP1' in the sensor layer 140. For example, the second connection portions CP2' may be electrically connected to the respective second electrode portions EP2' through contact portions TCNT' including at least one contact hole.

In an embodiment, a plurality of second connection portions CP2' may be formed between two adjacent second electrode portions EP2' in each of the second sensor electrodes TSE2'. For example, two second connection portions CP2 may be formed between two adjacent second electrode portions EP2' in each of the second sensor electrodes TSE2'.

In an embodiment, the second connection portions CP2' may have a shape that is bent one or more times. The second connection portions CP2' may have other shapes.

The display device 10 may include pixels PX and sensor electrodes TSE and TSE' according to various embodiments in addition to the embodiments disclosed in FIGS. 4 to 6. For example, the type, number, resolution, arrangement structure, shape and/or size of the pixels PX, the type, number and/or ratio of the pixels PX forming each unit pixel UPX, etc. may vary in various ways depending on the embodiments. In addition, the type, structure, shape, size and/or arrangement structure of the sensor electrodes TSE and TSE' may vary depending on the embodiments.

Figure 7:
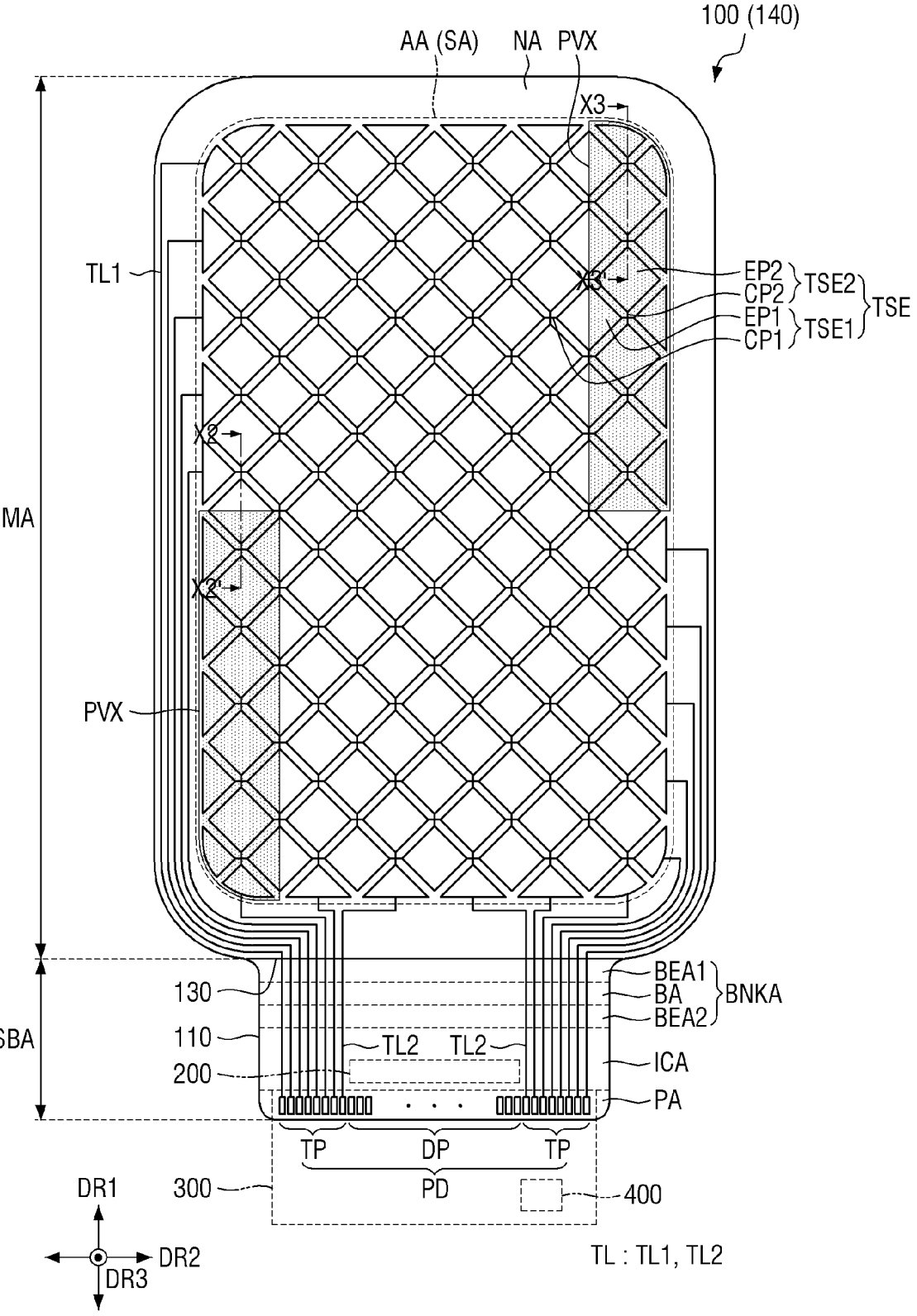
FIG. 7 is a plan view illustrating a display panel according to an embodiment of the present disclosure.
Figure 8:
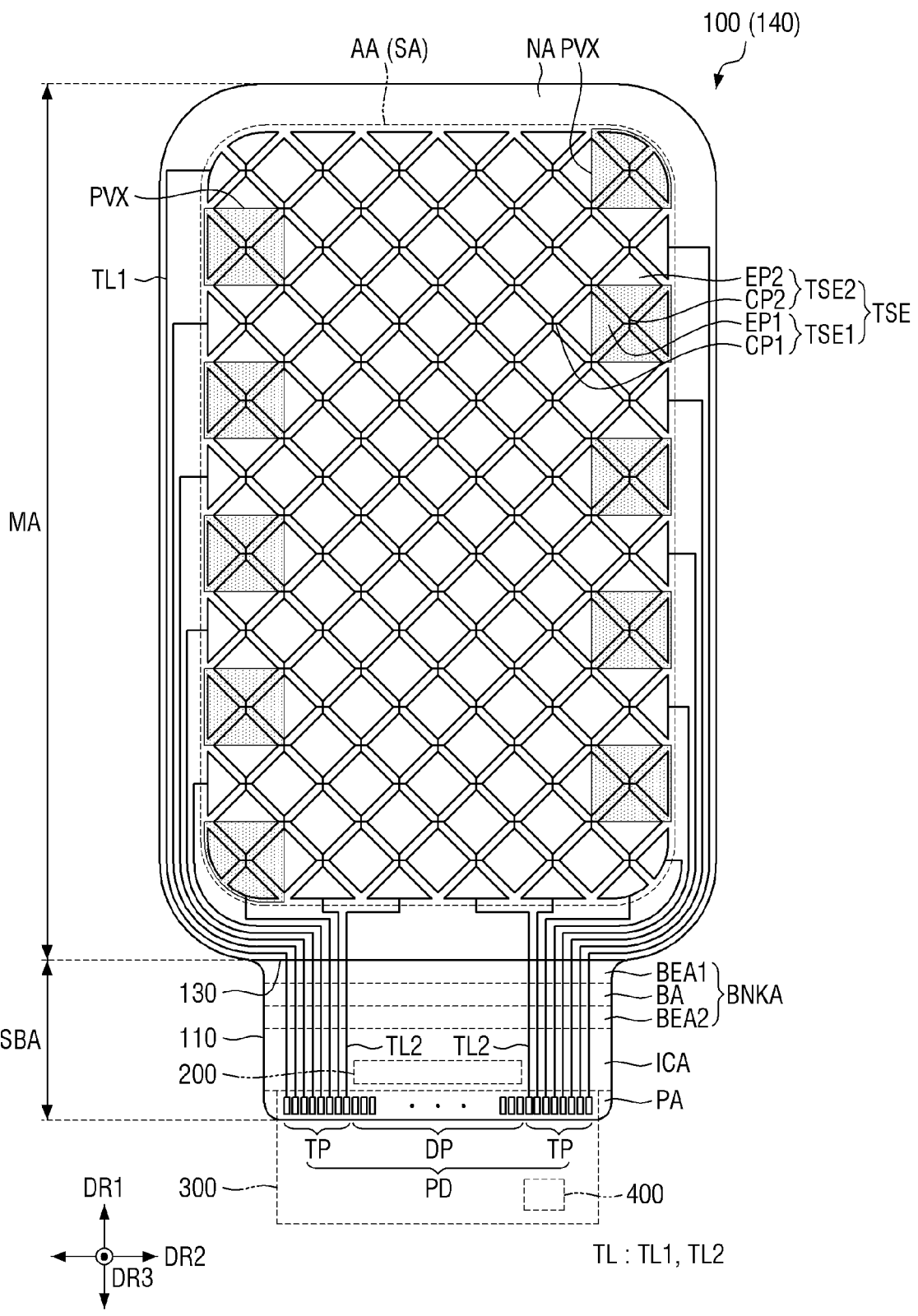
FIG. 8 is a plan view illustrating a display panel according to an embodiment of the present disclosure.
Figure 9:
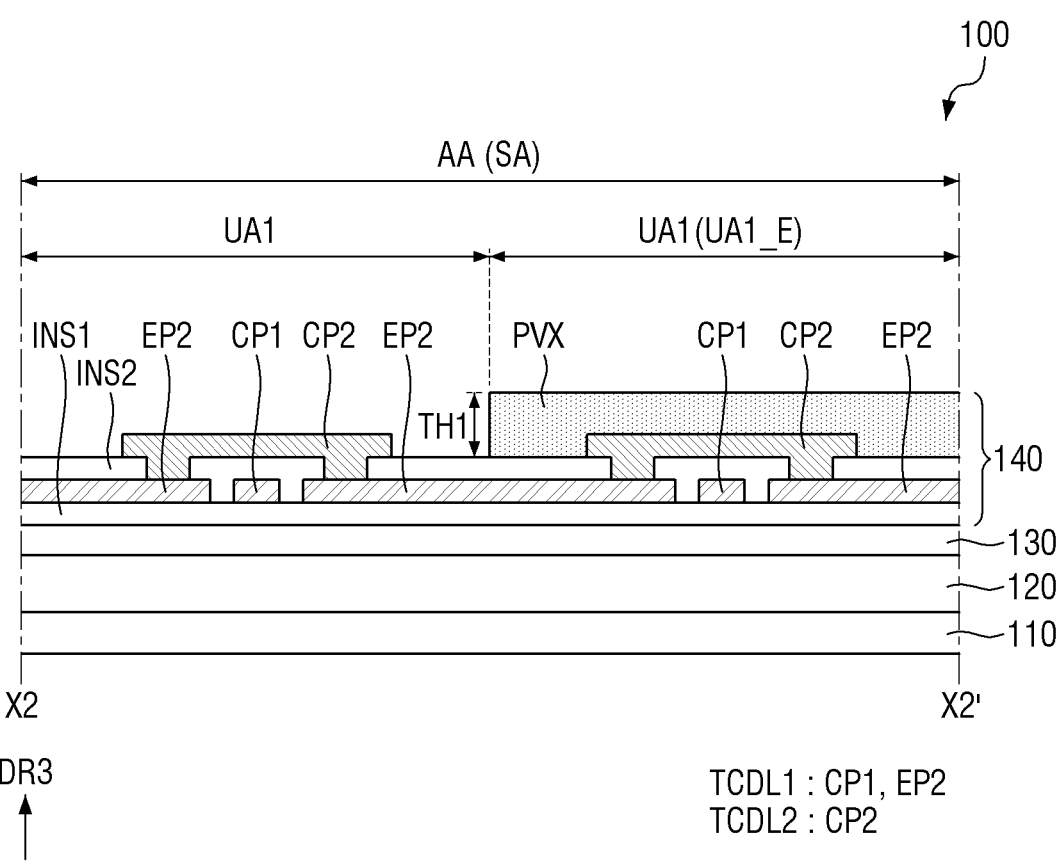
FIG. 9 is a cross-sectional view illustrating an example, taken along line X2-X2' of FIG. 7.

FIG. 7 is a plan view illustrating a display panel 100 according to an embodiment of the present disclosure. For example, FIG. 7 is a plan view illustrating the display panel 100 including a sensor layer 140 according to an embodiment, which is a modification of the embodiment of FIG. 4. FIG. 8 is a plan view illustrating a display panel 100 according to an embodiment of the present disclosure. For example, FIG. 8 is a plan view illustrating the display panel 100 including a sensor layer 140 according to an embodiment, which is a modification of the embodiment of FIG. 7. FIG. 9 is a cross-sectional view illustrating an example, taken along line X2-X2' of FIG. 7.

Referring to FIGS. 7 to 9 in conjunction with FIGS. 1 to 6, the sensor layer 140 may further include an insulating layer PVX (also referred to as an upper insulating layer or a passivation layer (PVS)) that is disposed only in some of the unit areas UA and is disposed partially on the sensor electrodes TSE. According to an embodiment, the insulating layer PVX may be formed only in a subset of the unit areas UA formed in the first sensor electrodes TSE1 which are located at the edges farthest from the points where the first sensor electrodes TSE1 are electrically connected to the first sensor lines TL1 (e.g., the unit areas UA1_E and UA2_E in FIG. 4).

For example, when the first sensor lines TL1 are electrically connected to the respective first sensor electrodes TSE1 at one end (e.g., the left end or right end) in the second direction DR2, the insulating layer PVX may be disposed in the unit areas UA where the opposite ends of the first sensor electrodes TSE1 in the second direction DR2 (e.g., the right ends or left ends) are located. FIGS. 7 and 8 disclose different embodiments in terms of the connection structure between the first sensor electrodes TSE1 and the first sensor lines TL1. The position of the insulating layer PVX may be also changed depending on the connection positions (e.g., connection points) of the first sensor electrodes TSE1 and the first sensor lines TL1.

The insulating layer PVX may be disposed on the sensor electrodes TSE and may cover the sensor electrodes TSE (or portions of the sensor electrodes TSE) located in the unit areas UA. For example, the insulating layer PVX may cover the first electrode portions EP1, the first connection portions CP1, the second electrode portions EP2 and the second connection portions CP2 located in the unit areas UA. The insulating layer PVX may be a single-layer or multi-layer insulating layer containing an inorganic insulating material and/or an organic insulating material. The material and the cross-sectional structure of the insulating layer PVX may vary depending on the embodiments.

FIG. 9 discloses an embodiment in which first electrode portions EP1, first connection portions CP1 and second electrode portions EP2 disposed in a first conductive layer TCDL1, while second connection portions CP2 are disposed in a second conductive layer TCDL2 located on the first conductive layer TCDL1. For example, the disclosed touch sensor has a structure in which the first electrode portions EP1, the first connection portions CP1 and the second electrode portions EP2 may be disposed in the first conductive layer TCDL1 disposed on a first insulating layer INS1 on an encapsulation layer 130, while the second connection portions CP2 disposed in the second conductive layer TCDL2 disposed on a second insulating layer INS2 on the first conductive layer TCDL1. According to an embodiment of the present disclosure, the first insulating layer INS1 may be a buffer layer provided to the sensor layer 140 and may include an inorganic insulating layer. The second insulating layer INS2 may be an interlayer dielectric layer provided to the sensor layer 140 and may include an inorganic insulating layer and/or an organic insulating layer. It should be understood, however, that the structure of the touch sensor may vary depending on the embodiments. For example, the second conductive layer TCDL2 including the second connection portions CP2 may be disposed between the first insulating layer INS1 and the second insulating layer INS2, and the first conductive layer TCDL1 including first electrode portions EP1, the first connection portions CP1 and the second electrode portions EP2 may be disposed on the second insulating layer INS2. Besides, the structure of the sensor electrodes TSE may be modified in a variety of ways.

In an embodiment, the insulating layers PVX may be provided in the same number of unit areas UA for each of the first sensor electrodes TSE1. For example, the insulating layer PVX may be provided only in a subset of the unit areas UA of each row where the first sensor electrodes TSE1 are located, which are located at the edges farthest from the points where the first sensor electrodes TSE1 are electrically connected to the first sensor lines TL1 (e.g., the unit areas UA1_E and UA2_E). It should be understood, however, that the embodiments of the present disclosure are not necessarily limited thereto. For example, the insulating layer PVX may be provided in a plurality of unit areas UA on at least one first sensor electrode TSE1.

In an embodiment, the insulating layer PVX may have a thickness that is appropriate for compensating for variations in mutual capacitance formed in the unit areas UA. For example, the insulating layer PVX may have a first thickness TH1 that is optimized for reducing or minimizing variations between the mutual capacitance formed in the unit areas UA1_E or UA2_E located at the farthest positions from the first sensor lines TL1 and the mutual capacitance formed in the other unit areas UA. For example, the thickness of the insulating layer PVX may be adjusted appropriately for the display 100 (or the design structure of the sensor layer 140 of the display panel 100) so that variations in mutual capacitance measured in each of the unit areas UA can be compensated for.

According to embodiments, the insulating layer PVX may be disposed in unit areas UA in which a relatively small mutual capacitance is formed depending on the connection structure and/or connection points between the sensor electrodes TSE and the sensor lines TL. In the unit areas UA where the sensor electrodes TSE are covered by the insulating layer PVX, the mutual capacitance may be changed due to a change in dielectric constant by the insulating layer PVX. For example, in the unit areas UA with the insulating layer PVX, the mutual capacitance utilized to sensing a touch input can increase, so that the touch input can be sensed more sensitively.

Figure 10:
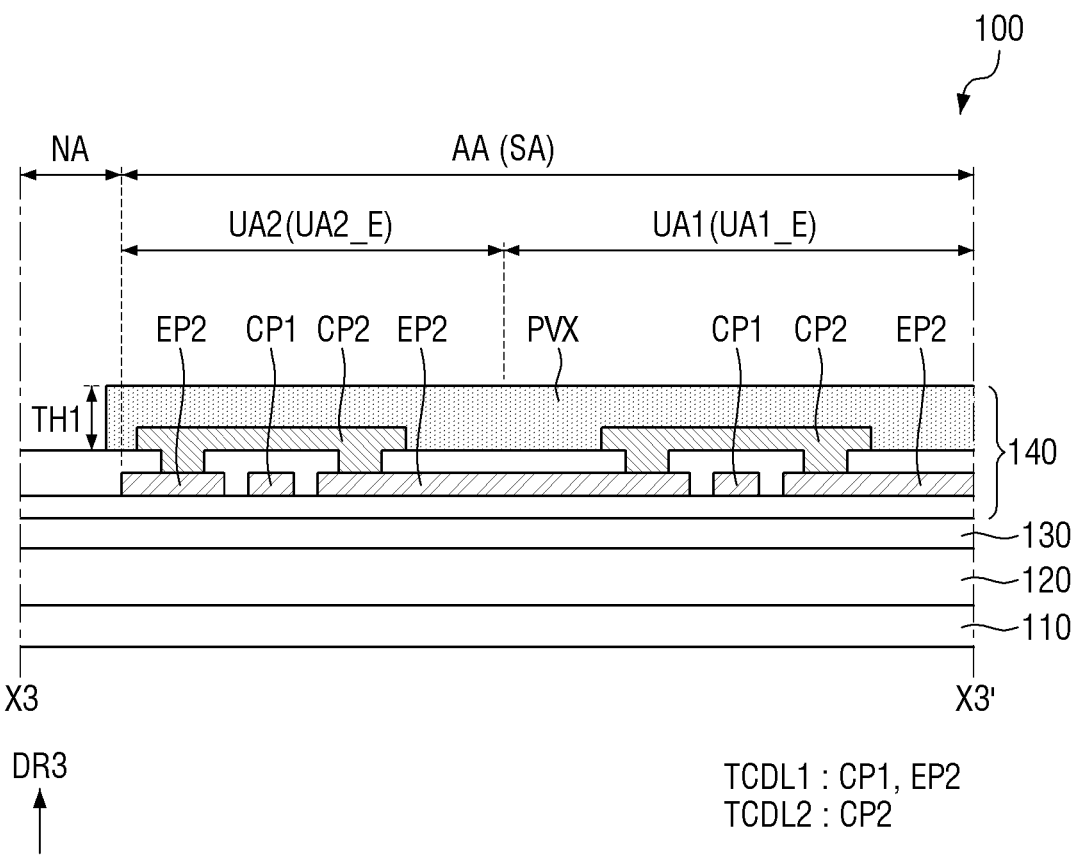
FIG. 10 is a cross-sectional view illustrating an example, taken along line X3-X3' of FIG. 7.
Figure 11:
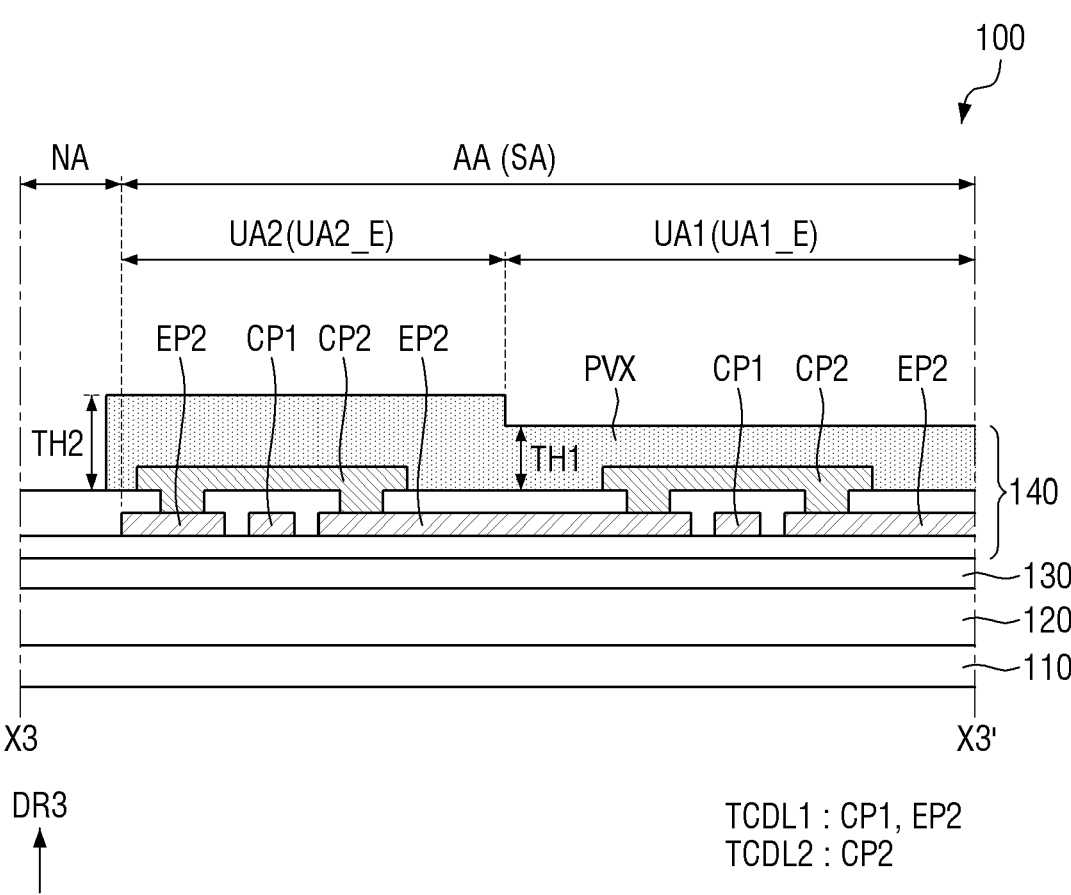
FIG. 11 is a cross-sectional view illustrating an example, taken along line X3-X3' of FIG. 7.

FIG. 10 is a cross-sectional view illustrating an example, taken along line X3-X3' of FIG. 7. FIG. 11 is a cross-sectional view illustrating an example, taken along line X3-X3' of FIG. 7. For example, FIGS. 10 and 11 show different embodiments with respect to the thickness of the insulating layer PVX.

Referring to FIG. 10 in conjunction with FIGS. 1 to 9, the insulating layer PVX may be provided and/or formed to have a generally uniform thickness. For example, in the unit areas UA where the insulating layer PVX is disposed, the insulating layer PVX has a substantially uniform first thickness TH1 regardless of the shape and/or area of the unit areas UA. Accordingly, the structure of the sensor layer 140 can be simplified, and the fabrication process can be simplified. According to an embodiment of the present disclosure, the first thickness TH1 may be, but is not necessarily limited to being, approximately 15,000 Å to 2,000 Å. For example, the thickness of the insulating layer PVX may be changed in a variety of ways depending on the size of the sensor electrodes TSE, the structure of the sensor layer 140, and/or the magnitude range of mutual capacitance required in each unit area UA, etc.

Referring to FIG. 11 in conjunction with FIGS. 1 to 9, the insulating layer PVX may be provided and/or formed to have different thicknesses for different unit areas UA. For example, if there are variations in mutual capacitance even between the unit areas with the insulating layer PVX (e.g., the unit areas UA1_E and UA2_E in FIG. 4) depending on the shape and/or area of the unit areas UA, the insulating layer PVX may be provided and/or formed in the unit areas UA with differential thicknesses, taking into account the required amount of compensation for the variations in the mutual capacitance. For example, if the unit areas UA1_E and UA2_E with the insulating layer PVX include first unit areas UA1_E each having a first area, and at least one second unit area UA2_E having a second area smaller than the first area, the insulating layer PVX may have the first thickness TH1 in the first unit area UA1_E and may have a second thickness TH2 larger than the first thickness TH1 in the second unit area UA2_E. Accordingly, variations in mutual capacitance formed in the unit areas UA of the sensing area SA can be more precisely compensated for, and the touch sensitivity can be further increased.

Figure 12:
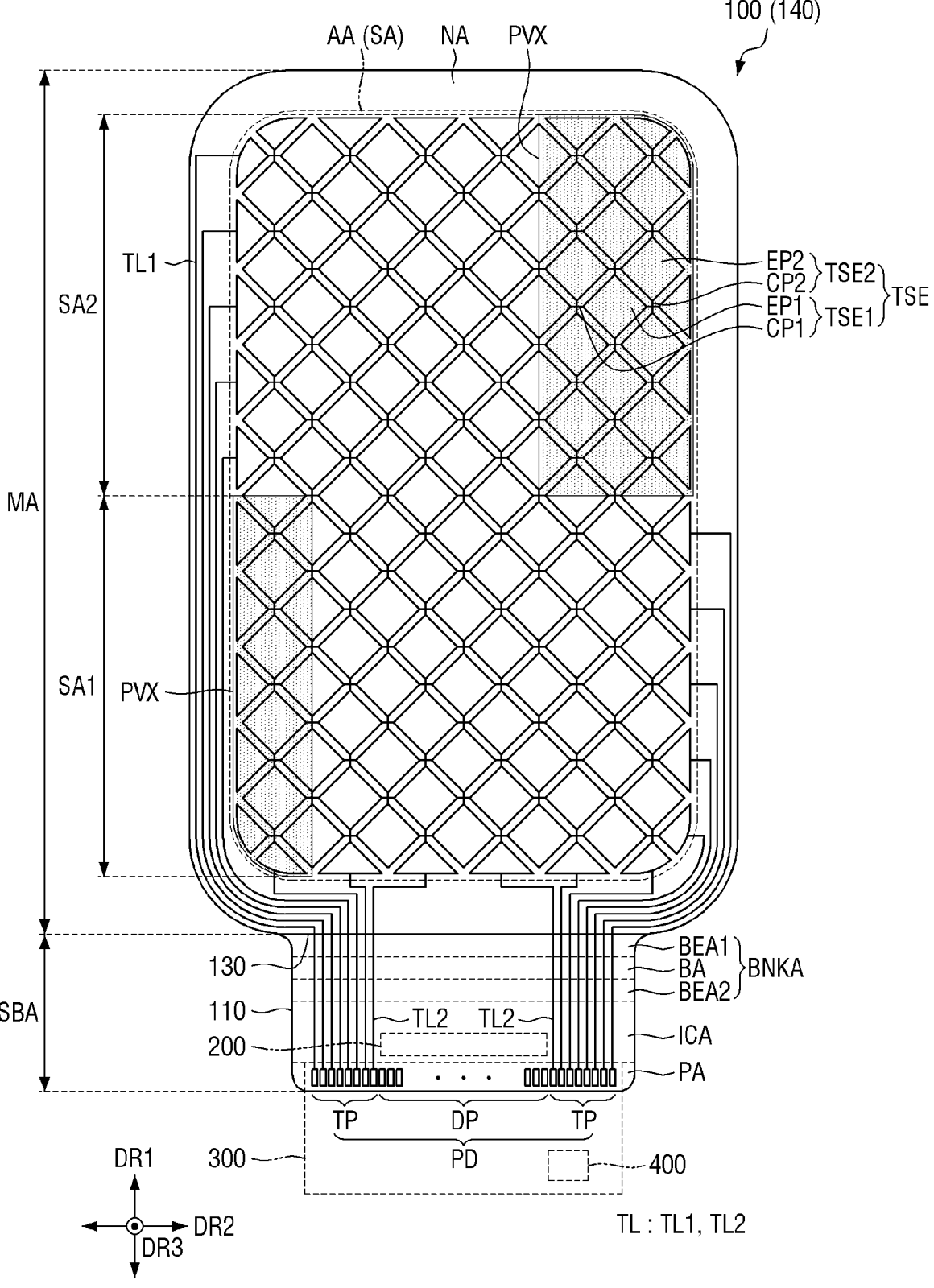
FIG. 12 is a plan view illustrating a display panel according to an embodiment of the present disclosure.

FIG. 12 is a plan view illustrating the display panel 100 according to an embodiment of the present disclosure. For example, FIG. 12 is a plan view illustrating a display panel 100 including a sensor layer 140 according to an embodiment, which is a modification of the embodiment of FIG. 7.

Referring to FIG. 12 in conjunction with FIGS. 1 to 11, the sensing area SA may be partitioned or divided into at least two sub-areas depending on the distance from the points where the second sensor electrodes TSE2 and the second sensor lines TL2 are electrically connected with each other. For example, the sensing area SA may include a first sensing area SA1 adjacent to the points where the second sensor electrodes TSE2 and the second sensor lines TL2 are electrically connected with each other (e.g., the lower edge of the sensing area SA), and a second sensing area SA2 farthest from the points where the second sensor electrodes TSE2 and the second sensor lines TL2 are electrically connected with each other, compared to the first sensing areas SA1.

In an embodiment, the insulating layer PVX may have a first area equal to at least one unit area UA (e.g., one unit area (UA)) on each of the first sensor electrodes TSE1 located in the first sensing area SA1, and a second area equal to at least two unit areas UA (e.g., two unit areas UA) on each of the first sensor electrodes TSE1 located in the second sensing area SA2. The first area and the second area may be determined so that variations in mutual capacitance between the unit areas UA with the insulating layer PVX in the first sensing area SA1 and the unit areas UA with the insulating layer PVX in the second sensing area SA2 can be appropriately compensated for. For example, if the magnitude of the mutual capacitance of the unit areas UA with the insulating layer PVX in the second sensing area SA2 is smaller than the magnitude of the mutual capacitance of the unit areas UA with the insulating layer PVX in the first sensing area SA1, the second area may be set to be greater than the first area. For example, the width of the insulating layer PVX provided in the second sensing area SA2 in the second direction DR2 may be greater than the width of the insulating layer PVX provided in the first sensing area SA1 in the second direction DR2. In this manner, it is possible to reduce or minimize variations in the mutual capacitance between the unit areas UA located in the first sensing area SA1 and the unit areas UA located in the second sensing area SA2.

Figure 13:
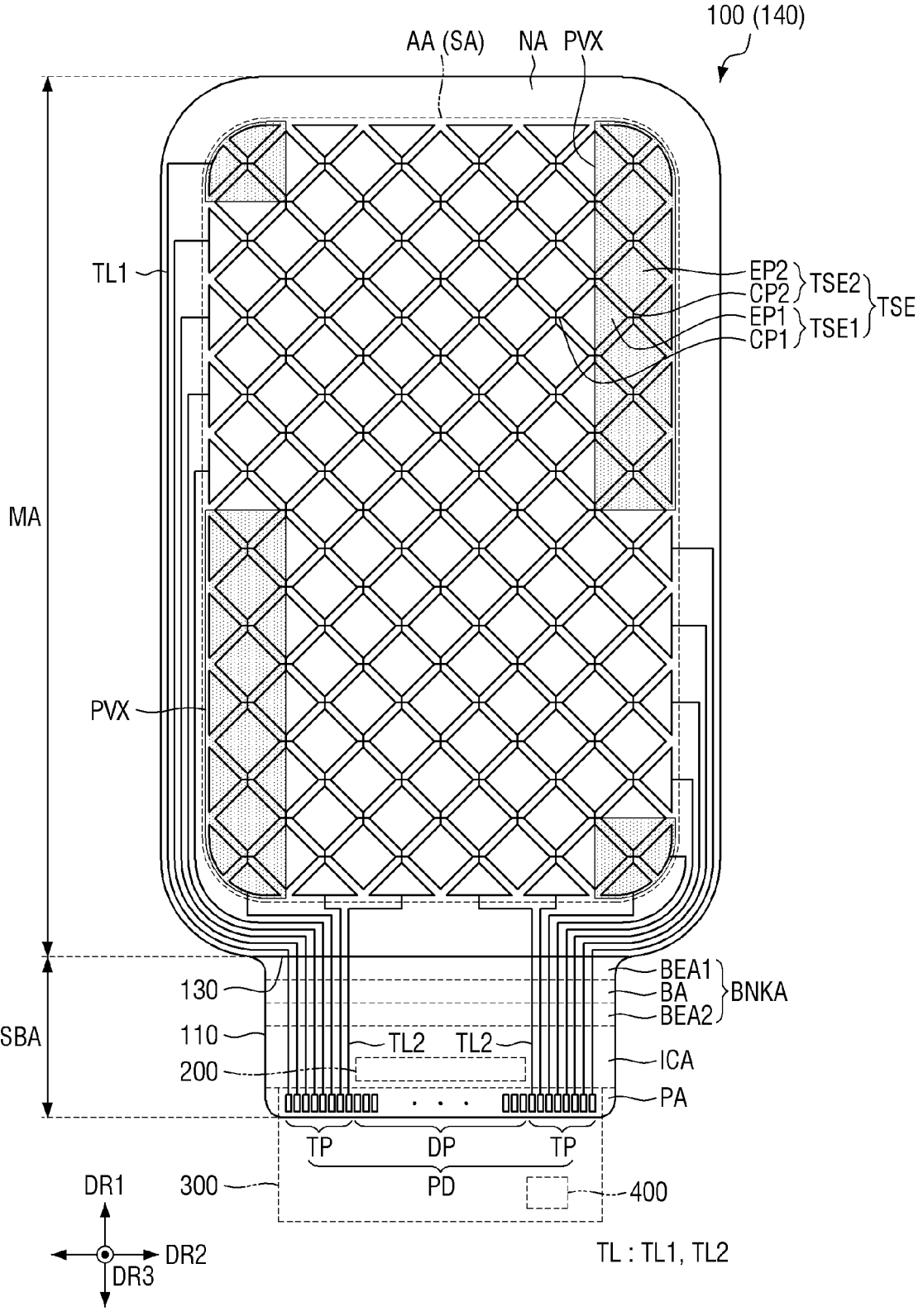
FIG. 13 is a plan view illustrating a display panel according to an embodiment of the present disclosure.
Figure 14:
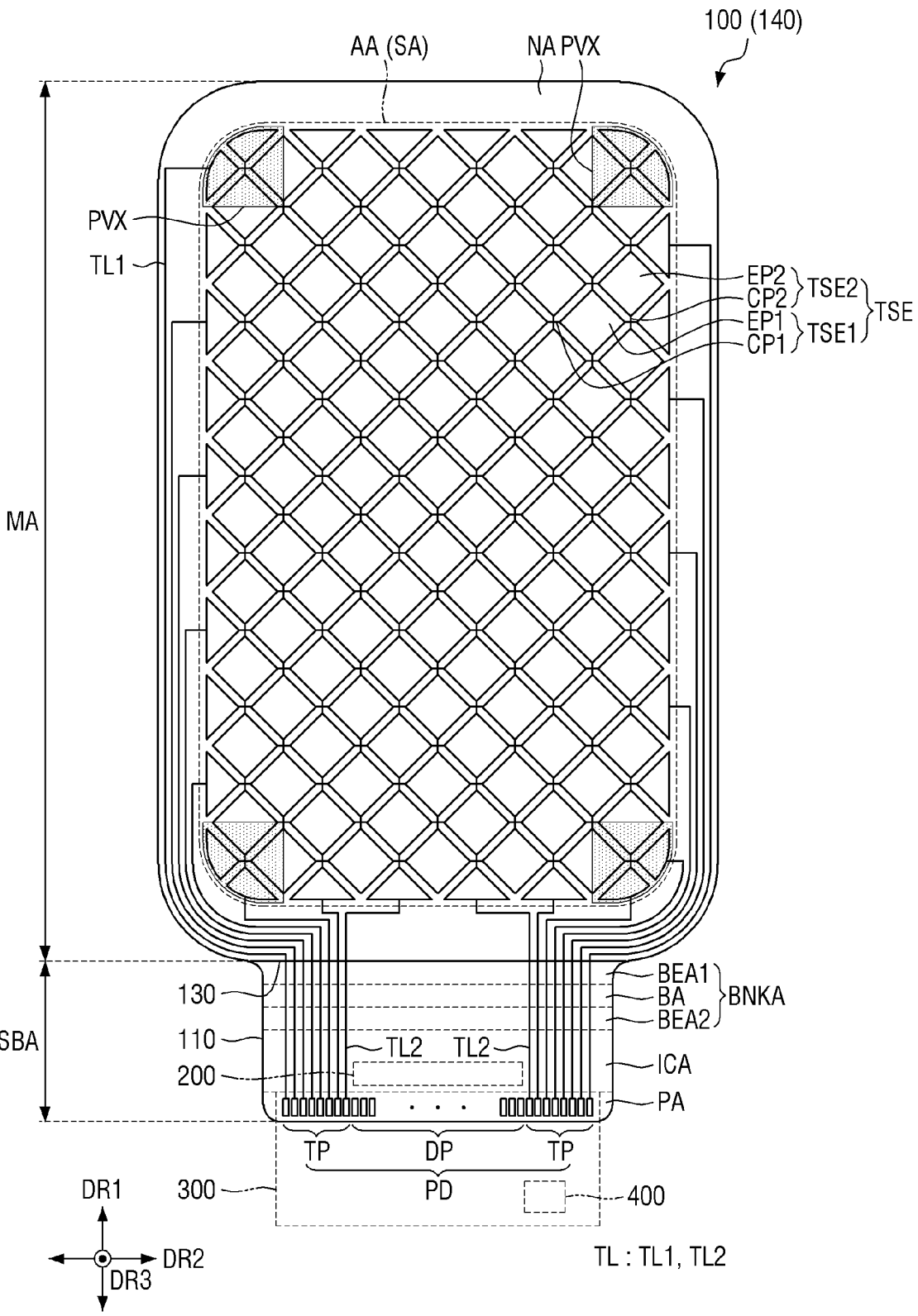
FIG. 14 is a plan view illustrating a display panel according to an embodiment of the present disclosure.

FIG. 13 is a plan view illustrating a display panel 100 according to an embodiment of the present disclosure. FIG. 14 is a plan view illustrating a display panel 100 according to an embodiment of the present disclosure. For example, FIGS. 13 and 14 are plan views illustrating display panels 100 including a sensor layer 140 according to different modifications of the embodiment of FIG. 7.

Referring to FIGS. 13 and 14 in conjunction with FIGS. 1 to 12, the sensing area SA may include at least one second unit area UA2 (see FIG. 4) having a relatively small area, and an insulating layer PVX may be provided at least in the second unit area UA2. For example, the sensing area SA may include at least one corner area including at least one second unit area UA2, and the insulating layer PVX may cover the sensor electrodes TSE at the corner area. As an example, the sensing area SA may include four corner areas each including one second unit area UA2, and the insulating layer PVX may cover the sensor electrodes TSE at the four corner areas. According to an embodiment of the present disclosure, if there is a unit area UA with a relatively small area in another portion of the sensing area SA, e.g., the hole area HA of FIGS. 1 and 2, the insulating layer PVX may also be disposed in the unit area UA.

In an embodiment, the insulating layer PVX may be provided not only in the second unit areas UA2 but also in the unit areas UA located at the edge farthest from the points where the first sensor electrodes TSE1 are electrically connected to the first sensor lines TL1 (e.g., the unit areas UA1_E and UA2_E in FIG. 4). According to an embodiment, the insulating layer PVX may be disposed only in the second unit areas UA2 and not in the first unit areas UA1 (see FIG. 4) having a larger area than the second unit areas UA2, as shown in FIG. 14.

According to the above-described embodiments, variations in the mutual capacitance due to differences in area between the unit areas UA can be appropriately compensated for. For example, by disposing the insulating layer PVX on the second unit area UA2 having a relatively small mutual capacitance to cover the sensor electrodes TSE, the mutual capacitance of the second unit area UA2 can be increased. Accordingly, variations in mutual capacitance of the unit areas UA located in the sensing area SA can be reduced or minimized, and touch sensitivity can be increased.

According to the embodiments of FIGS. 7 to 14, the insulating layer PVX may be disposed only in some of the unit areas UA so that variations in the mutual capacitance due to the line connection structure of the touch sensor and/or differences in area between the unit areas UA can be compensated for. In some embodiments, variations in the mutual capacitance of the unit areas UA can be more precisely compensated for by adjusting the thickness of the insulating layer PVX. According to the above-described embodiments, it is possible to reduce or minimize variations in mutual capacitance formed between the sensor electrodes TSE of the touch sensor. In this manner, it is possible to prevent or reduce that a touch input is erroneously recognized, i.e., not recognized or misrecognized, and the touch sensitivity can be increased.

In concluding the detailed description, those skilled in the art will appreciate that many variations and modifications can be made to the embodiments without substantially departing from the principles of the present disclosure.

What is claimed is:

1. A display device, comprising:
a display layer comprising pixels disposed in a display area;
a sensor layer comprising:
a sensing area overlapping the display area; and
unit areas corresponding to touch nodes disposed in the sensing area;
sensor electrodes disposed in the unit areas of the sensor layer;
sensor lines electrically connected to the sensor electrodes; and
an insulating layer exclusively disposed in a subset of the unit areas and disposed on portions of the sensor electrodes,
wherein the insulating layer is disposed as a plurality of discrete shapes that are spaced apart from one another, in a plan view, and
wherein at least two of the discrete shapes that are spaced apart from one another each cover the sensor electrodes in a different corner area thereof.

2. The display device of claim 1, wherein the sensor electrodes comprise first sensor electrodes arranged in a first direction in the sensing area and each extended in a second direction crossing the first direction, and wherein the sensor lines comprise first sensor lines electrically connected to the first sensor electrodes at one end of each of the first sensor electrodes in the second direction.

3. The display device of claim 2, wherein the insulating layer is disposed in unit areas where opposite ends of the first sensor electrodes in the second direction are disposed, and is disposed on the sensor electrodes disposed in the unit areas.

4. The display device of claim 3, wherein the insulating layer is disposed on each of the first sensor electrodes in a single unit area among the unit areas where each of the first sensor electrodes is disposed, the single unit area being disposed at an edge farthest from a corresponding first sensor line electrically connected to each of the first sensor electrodes.

5. The display device of claim 2, wherein the sensor electrodes further comprise second sensor electrodes arranged in the second direction in the sensing area and each extended in the first direction, and
wherein the sensor lines further comprise second sensor lines electrically connected to the second sensor electrodes.

6. The display device of claim 5, wherein the second sensor lines are electrically connected to the second sensor electrodes at one ends of the second sensor electrodes in the first direction, and
wherein the sensing area comprises a first sensing area adjacent to points where the second sensor electrodes are electrically connected to the second sensor lines, and a second sensing area disposed farther from the points where the second sensor electrodes are electrically connected to the second sensor lines than the first sensing area is.

7. The display device of claim 6, wherein the insulating layer includes a first area corresponding to at least one unit area on each of the first sensor electrodes disposed in the first sensing area, and includes a second area corresponding to at least two unit areas on each of the first sensor electrodes disposed in the second sensing area, and
wherein the second area is larger than the first area.

8. The display device of claim 1, wherein the unit areas comprise first unit areas each including a first area, and at least one second unit area including a second area that is smaller than the first area.

9. The display device of claim 8, wherein the insulating layer is disposed in at least the second unit area.

10. The display device of claim 9, wherein the each of the different corner areas comprises the second unit area.

11. The display device of claim 1, wherein the subset of unit areas with the insulating layer comprise first unit areas each including a first area, and at least one second unit area including a second area that is smaller than the first area.

12. A display device, comprising:
a display layer comprising pixels disposed in a display area;
a sensor layer comprising:
a sensing area overlapping the display area; and
unit areas corresponding to touch nodes disposed in the sensing area;
sensor electrodes disposed in the unit areas of the sensor layer;
sensor lines electrically connected to the sensor electrodes; and
an insulating layer exclusively disposed in a subset of the unit areas and disposed on portions of the sensor electrodes, wherein the subset of unit areas with the insulating layer comprise first unit areas each including a first area, and at least one second unit area including a second area that is smaller than the first area, and wherein the insulating layer has a first thickness in the first unit areas and a second thickness, that is greater than the first thickness, in the at least one second unit area.

13. A touch sensor comprising unit areas corresponding to touch nodes in a sensing area, wherein the touch sensor comprises:

sensor electrodes disposed in the unit areas;

sensor lines electrically connected to the sensor electrodes; and an insulating layer exclusively disposed in a subset of the unit areas and disposed on portions of the sensor electrodes, wherein the subset of the unit areas with the insulating layer comprises first unit areas each including a first area, and at least one second unit area having a second area that is smaller than the first area, and wherein the insulating layer has a first thickness in the first unit areas and a second thickness that is greater than the first thickness in the at least one second unit area.

14. The touch sensor of claim 13, wherein the sensor electrodes comprise first sensor electrodes arranged in a first direction and each extended in a second direction, crossing the first direction, in the sensing area, and wherein the sensor lines comprise first sensor lines electrically connected to the first sensor electrodes at one end of each of the first sensor electrodes in the second direction.

15. The touch sensor of claim 14, wherein the insulating layer is disposed in unit areas where opposite ends of the first sensor electrodes in the second direction are disposed, and is disposed on the sensor electrodes disposed in the unit areas.

16. The touch sensor of claim 14, wherein the sensor electrodes further comprise second sensor electrodes arranged in the second direction and each extended in the first direction in the sensing area, and wherein the sensor lines further comprise second sensor lines electrically connected to the second sensor electrodes at one ends of the second sensor electrodes in the first direction.

17. The touch sensor of claim 16, wherein the sensing area comprises a first sensing area adjacent to points where the second sensor electrodes are electrically connected to the second sensor lines, and a second sensing area disposed farther from the points where the second sensor electrodes are electrically connected to the second sensor lines than the first sensing area is, and wherein the insulating layer includes a first area corresponding to at least one unit area on each of the first sensor electrodes disposed in the first sensing area, and includes a second area corresponding to at least two unit areas on each of the first sensor electrodes disposed in the second sensing area.

18. The touch sensor of claim 13, wherein the unit areas comprise first unit areas each including a first area, and at least one second unit area including a second area that is smaller than the first area.

19. The touch sensor of claim 18, wherein the insulating layer is disposed in at least the second unit area.

* * * * *